US008144591B2

(12) United States Patent
Ghai et al.

(10) Patent No.: US 8,144,591 B2
(45) Date of Patent: Mar. 27, 2012

(54) SYSTEM AND METHOD FOR REDUCING LATENCY IN CALL SETUP AND TEARDOWN

(75) Inventors: Rajat Ghai, Sandwich, MA (US); Jim Towey, Sandwich, MA (US)

(73) Assignee: Cisco Technology, Inc., San Jose, CA (US)

(*) Notice: Subject to any disclaimer, the term of this patent is extended or adjusted under 35 U.S.C. 154(b) by 183 days.

(21) Appl. No.: 12/168,650

(22) Filed: Jul. 7, 2008

(65) Prior Publication Data

US 2009/0141625 A1 Jun. 4, 2009

Related U.S. Application Data

(60) Provisional application No. 60/958,349, filed on Jul. 5, 2007.

(51) Int. Cl.
*H04L 12/26* (2006.01)

(52) U.S. Cl. ........ 370/235; 370/328; 370/381; 370/384; 370/395.31; 370/395.72; 709/227; 709/231; 455/448; 455/556.1; 455/560

(58) Field of Classification Search .......... 370/230–235, 370/315, 328, 401, 352, 310, 374, 378, 381, 370/384, 395.31, 395.32, 395.72, 410; 709/227–229, 709/231, 232, 201–203, 212, 213–219, 244; 455/448, 550.1, 556.1, 560; 726/1; 707/791, 707/793, 795, 797
See application file for complete search history.

(56) References Cited

U.S. PATENT DOCUMENTS

| 6,286,052 B1* | 9/2001 | McCloghrie et al. ......... 370/235 |
| 6,539,483 B1* | 3/2003 | Harrison et al. ................... 726/1 |
| 6,678,835 B1* | 1/2004 | Shah et al. ...................... 709/232 |
| 6,847,609 B1* | 1/2005 | Sarnikowski et al. ........ 370/235 |
| 7,046,680 B1* | 5/2006 | McDysan et al. ............. 709/229 |
| 7,406,057 B2* | 7/2008 | Isomaki et al. ................ 370/401 |
| 2002/0091819 A1* | 7/2002 | Melchione et al. ........... 709/201 |
| 2002/0147828 A1* | 10/2002 | Chen et al. ..................... 709/231 |
| 2002/0184374 A1* | 12/2002 | Morikawa ...................... 709/229 |
| 2003/0012205 A1* | 1/2003 | Foti et al. ....................... 370/401 |
| 2003/0021283 A1* | 1/2003 | See et al. ....................... 370/401 |
| 2003/0027595 A1* | 2/2003 | Ejzak ............................. 455/560 |

(Continued)

FOREIGN PATENT DOCUMENTS

| WO | WO-2004/071104 A2 | 8/2004 |
| WO | WO 2007090463 A1 * | 8/2007 |

OTHER PUBLICATIONS

International Search Report and Written Opinion issued for corresponding International Patent Application No. PCT/US2008/069328.

3GPP TS 23.203 V7.3.0 (Jun. 2007), 3rd Generation Partnership Project; Techinical Specification Group Services and System Aspects; Policy and charging control architecture (Release 7), Global System for Mobile Communications (GSM), http://www.3gpp.org/ftp/Specs/html-info/23203.htm (Additional versions of the document are available at this link).

(Continued)

*Primary Examiner* — Jeffrey M Rutkowski
(74) *Attorney, Agent, or Firm* — Wilmer Cutler Pickering Hale and Dorr LLP

(57) ABSTRACT

Systems and methods for reducing latency in call setup and teardown are provided. A network device with integrated functionalities and a cache is provided that stores policy information to reduce the amount of signaling that is necessary to setup and teardown sessions. By handling various aspects of the setup and teardown within a network device, latency is reduced and the amount of bandwidth needed for setup signaling is also reduced.

20 Claims, 19 Drawing Sheets

U.S. PATENT DOCUMENTS

| | | | |
|---|---|---|---|
| 2005/0135375 A1 | 6/2005 | Hurtta et al. | |
| 2005/0232225 A1 | 10/2005 | Pelaez et al. | |
| 2006/0203773 A1* | 9/2006 | Georges et al. | 370/230 |
| 2006/0271693 A1* | 11/2006 | Thiebaut et al. | 709/229 |
| 2007/0140299 A1 | 6/2007 | Hofmann et al. | |
| 2007/0226775 A1 | 9/2007 | Andreasen et al. | |
| 2008/0155659 A1 | 6/2008 | Gazier et al. | |
| 2008/0192674 A1* | 8/2008 | Wang et al. | 370/315 |
| 2008/0256251 A1* | 10/2008 | Huotari et al. | 709/229 |
| 2008/0313306 A1* | 12/2008 | Skog | 709/218 |
| 2008/0320149 A1* | 12/2008 | Faccin | 709/228 |
| 2010/0040047 A1* | 2/2010 | Castellanos Zamora et al. | 370/352 |
| 2010/0232353 A1* | 9/2010 | Hu et al. | 370/328 |

OTHER PUBLICATIONS

"All-IP Core Network Multimedia Domain, Service Based Bearer Control—Tx Interface Stage-3," 3GPP2 X.S0013-013-0, Version 1.0, Dec. 2007. Available at http://www.3gpp2.org/Public_html/specs/X.S0013-013-0_v1.0_080224.pdf.

3GPP TS 29.214 V7.1.0 (Jun. 2007), 3rd Generation Partnership Project; Techincal Specification Group Core Network and Terminals; Policy and Charging Control over Rx reference point (Release 7), Global System for Mobile Communications (GSM), http://www.3gpp.org/ftp/Specs/html-info/29214.htm (Additional versions of the specification are available at this link).

Rosenberg, J. et al., Reliability of Provisional Responses in the Session Initiation Protocol (SIP), The Internet Society, http://www.ietf.org/rfc/rfc3262.txt, Jun. 2002.

* cited by examiner

SYSTEM AND METHOD FOR REDUCING LATENCY IN CALL SETUP AND TEARDOWN

CROSS-REFERENCE TO RELATED APPLICATIONS

This application claims the benefit under 35 U.S.C. §119(e) of U.S. Provisional Patent Application No. 60/958,349, entitled "System and Method for Reducing Latency in Call Setup and Teardown," filed Jul. 5, 2007, which is hereby incorporated by reference herein in its entirety.

FIELD OF THE DISCLOSURE

This disclosure relates to reducing latency in call setup and teardown in packet data networks.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The data flow may include a number of packets or a single packet.

The use of packet-based approaches, while allowing used resources to be allocated more efficiently, can also have problems with controlling the level of service provided to a user or limiting the amount of bandwidth a user can use. Unlike circuit switching where the amount of bandwidth is specified when the call is setup, packet based approaches typically try to use as much bandwidth as is needed or available and usually do not limit the data flow unless packets are being dropped. Some protocols such as User Datagram Protocol (UDP), which is used for multimedia applications, do not have any limiting mechanism in the protocol. Protocols such as UDP as used with applications such as streaming video, Voice Over IP (VOIP), and streaming audio because the stream is not interrupted when a small number of packets are lost or dropped by equipment during transmission. When packets are lost or dropped the quality of the transmission can degrade, but there is no attempt to recover the lost information because typically there is no time and the user does not want the transmission interrupted to wait for the lost information. Because some applications do not have any rate limiting or level of service provided in the protocol, Quality of Service (QoS) and other methods to enforce policies to control the data flow have been developed.

In order to enforce policies to control the data flow, hardware and software is deployed on packet-based networks to monitor and control the data flow. Typically, the policy control function is located on a separate network device from the network devices handling the data flows from mobile nodes. This means that communications between these network devices needs to take place before decisions are made about how to control the data flow. This communication increases setup and teardown latency for call sessions and increases the number of signaling events that occur for policy enforcement.

SUMMARY OF THE DISCLOSURE

Systems and methods for reducing latency in call setup and teardown are provided. More particularly, a policy proxy is provided that learns policy information and caches this information to provide this information locally later. By learning and storing locally information that is needed to setup and teardown sessions, messaging events can be reduced. In some embodiments, multiple functions are implemented on the same network device or network device to reduce signaling events and to reduce latency in processing call sessions.

DETAILED DESCRIPTION

Systems and methods for reducing latency in call setup and teardown are provided. In some embodiments, a cache is implemented that stores certain policy data fields for a call session. The cache can then be accessed at times to retrieve information and avoid seeking the information elsewhere, which can be time consuming. The cache can also be used as a virtual policy decision function in combination with other network devices to reduce the signaling interaction between various network devices. When the cache acts like a virtual policy decision function, it supports local policy and dynamic network policy. For dynamic policy, the cache utilizes various interfaces to learn policies, and then utilizes these policies locally to reduce or eliminate signaling events.

Embodiments of the invention can be implemented in different ways. In one embodiment, a local policy is provided. In a second embodiment, an external policy decision function is used in conjunction with a local policy. In a third embodiment, an external policy decision function is used in conjunction with a local policy and cache.

Figure 1:
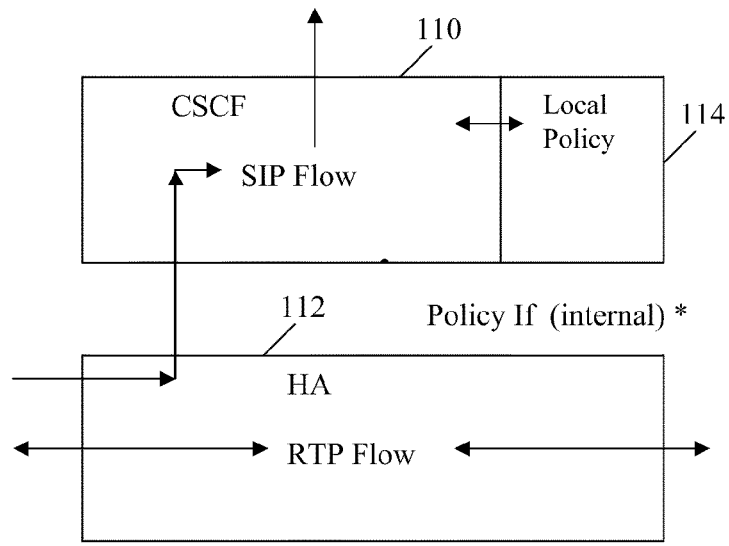
FIG. 1 is a diagram of a local policy used in conjunction with packet data transmissions in accordance with certain embodiments.

FIG. 1 illustrates an embodiment where a local policy is provided. FIG. 1 includes a call session control function (CSCF) 110, a home agent (HA) 112, and a local policy 114. These functions can be provided on one or more network devices as is described below. Local policy 114 can enforce policies based on the CSCF service subscription or the network operator's CSCF service configuration. This type of setup may not address overall Quality of Service (QoS) and may not provide enforcement of QoS. The setup of FIG. 1 may be used in configurations deploying other types of functions, as is described in greater detail below.

When CSCF 110 receives a setup message, such as an invite message, an analysis can be performed on the requested media parameters. These requested media parameters are checked against the local policies that map to the setup message (e.g., invite). The local policies can be configured in a hierarchical fashion. At the highest level are global policies that apply to the whole system. Then there are policies that are applied to the CSCF service of sessions. Finally, there are policies that are mapped from the session template. The policies may be configured for the domain to which the user (session initiator) belongs.

The data structures provided below can be configured and populated with setting for local policy 114. The below structure can be common to the virtual private networks (VPNs) and the CSCF services.

```
typedef struct {
    uint32_t require_cscf_session_recovery : 1;
    uint32_t allow_over_subscription : 8;
} cscf_global_policy_t;
```

The below structure may be unique to every CSCF service instance.

```
typedef struct {
uint32_t  allow_multiple_resistrations : 1;
uint32_t  allow_video : 1;
uint32_t  allow_roaming : 1;
uint32_t  require_spoofing_prevention : 1;
uint32_t  subscriber_policy_overide : 1;
uint32_t  require_sigcomp : 1;
uint32_t  sip_dos : 2; /* 00 - disabled, 01 - normal, 10 - aggressive */
uint32_t  topology_hiding : 2; /* 00 - disabled, 01 - standard, 10 - starent method */
uint32_t  topology_hiding_direction : 2 ; /* 10 - access , 01 - core, 11 - both */
uint32_t  overload_reject : 1; /* 0 - enabled, 1 - disabled */
uint32_t  overload_reject_code : 1 ; /* 0 - admin prohibited code, 1 - insufficient resources */
} cscf_service_policy_t;
```

There can also be a list of profiles that are indexed by name. The "default" name would be a reserved name for the default policy profile. The default policy profile can be prepopulated. The list would be the part of the VPN/CSCF section in the session manager instance. The list node can be of the following type

```
typedef struct {
sn_string profile_name[MAX_POLICY_PROFILE_NAME_SIZE];
sn_list policy_records;
} cscf_policy_profile_t;
typedef struct {
sn_string aor[MAX_AOR_SIZE];
uint32_t QoS_profile;
uint32_t  allow_noauth : 1;
uint32_t  allow_unsecure : 1;
uint32_t  allow_multiple_resistrations : 1;
uint32_t  allow_video : 1;
uint32_t  allow_roaming : 1;
uint32_t  require_sigcomp : 1;
uint32_t topology_hiding : 2; /* 00 - disabled, 01 - standard, 10 - starent method */
uint32_t topology_hiding_direction : 2 ; /* 10 - access , 01 - core, 11 - both */
uint32_t overload_reject : 1; /* 0 - enabled, 1 - disabled */
uint32 overload reject code : 1 ; /* 0 - admin prohibited code, 1 - insufficient resources
*/
} cscf_policy_record_node_t;
```

The default policy profile may be set as follows:

```
aor =                                  "*";
external_policy_server_list =          "";
external_accounting_server_list =      "";
QoS_profile =                          QoS_TYPE_BEST_EFFORT;
allow_video =                          CSCF_POLICY_DENY;
allow_noauth =                         CSCF_POLICY_DENY;
allow_unsecure =                       CSCF_POLICY_DENY;
allow_multiple_registrations =         CSCF_POLICY_DENY;
allow_roaming        = CSCF_POLICY_DENY;
require_sigcomp =                      CSCF_POLICY_DISABLE;
topology_hiding =                      CSCF_POLICY_TOPOLOGY_HIDING_DISABLE;
topology_hiding_direction =            CSCF_POLICY_TOPOLOGY_HIDING_DIRECTION_NONE;
overload_reject =                      CSCF_POLICY_DISABLE;
overload_reject_code =
    CSCF_POLICY_OVERLOAD_REJECT_CODE_INSUFFICIENT_RESOURCES;
```

The domain config can have the following structures related to policy elements.

```
sn_string external_policy_server_list
[MAX_PEER_SERVER_LIST_NAME];
sn_string external_accounting_server_list
[MAX_PEER_SERVER_LIST_NAME];
```

Policy config structure can be implemented as follows:

```
typedef struct {
    cscf_global_policy_t *cscfGlobalPolicy_p;
    cscf_service_policy_t *cscfServicePolicy_p;
    cscf_policy_record_node_t *cscfPolicyRecordNode_p;
}policy_config_t;
```

Policy control block structure, which may be a member of call leg.

```
typedef sn_string AoR;
typedef struct policy_control_block
{
    // Static / Configuration Part
    policy_config_t policyConfig;
    // AoR for which this Policy Control block is for
    AoR aor;
    // Private data,
    // will be filled after first AoR policy lookup is done
    // This is included so that we don't have to do policy lookups repetitively
    // In future we can also get the policy record from an external server and store it
    // here (for this AoR)
    CSCF_ULONG allow_video : 1;
    // APIs
    cscf_policy_allow_status_t (*video)(struct policy_control_block
*policyControlBlock_p);
    cscf_policy_allow_status_t (*noauth)(struct policy_control_block
*policyControlBlock_p);
    cscf_policy_allow_status_t (*unsecure)(struct policy_control_block
*policyControlBlock_p);
    cscf_policy_allow_status_t (*roaming)(struct policy_control_block
*policyControlBlock_p);
    cscf_policy_allow_status_t (*multiple_registrations)(struct policy_control_block
*policyControlBlock_p);
    cscf_policy_enable_status_t (*require_sigcomp)(struct policy_control_block
*policyControlBlock_p);
    cscf_policy_QoS_status_t (*QoS_profile)(struct policy_control_block
*policyControlBlock_p);
    cscf_policy_topology_hiding_t (*topology_hiding)(struct policy_control_block
*policyControlBlock_p);
    cscf_policy_overload_reject_t (*overload_reject)(struct policy_control_block
*policyControlBlock_p);
    char* (*external_policy_server_list)(struct policy_control_block
*policyControlBlock_p);
    char* (*external_accounting_server_list)(struct policy_control_block
*policyControlBlock_p);
}policy_control_block_t ;
```

Policy profiles List structure, which contains a list of policy profiles and default policy for a context.

```
typedef struct
{
    sn_list_t *cscfPolicyProfileList;
    /*Default Table*/
    cscf_policy_record_node_t defaultCscfPolicyProfile;
}cscfcpsPolicyProfileList_t;
```

Figure 2:
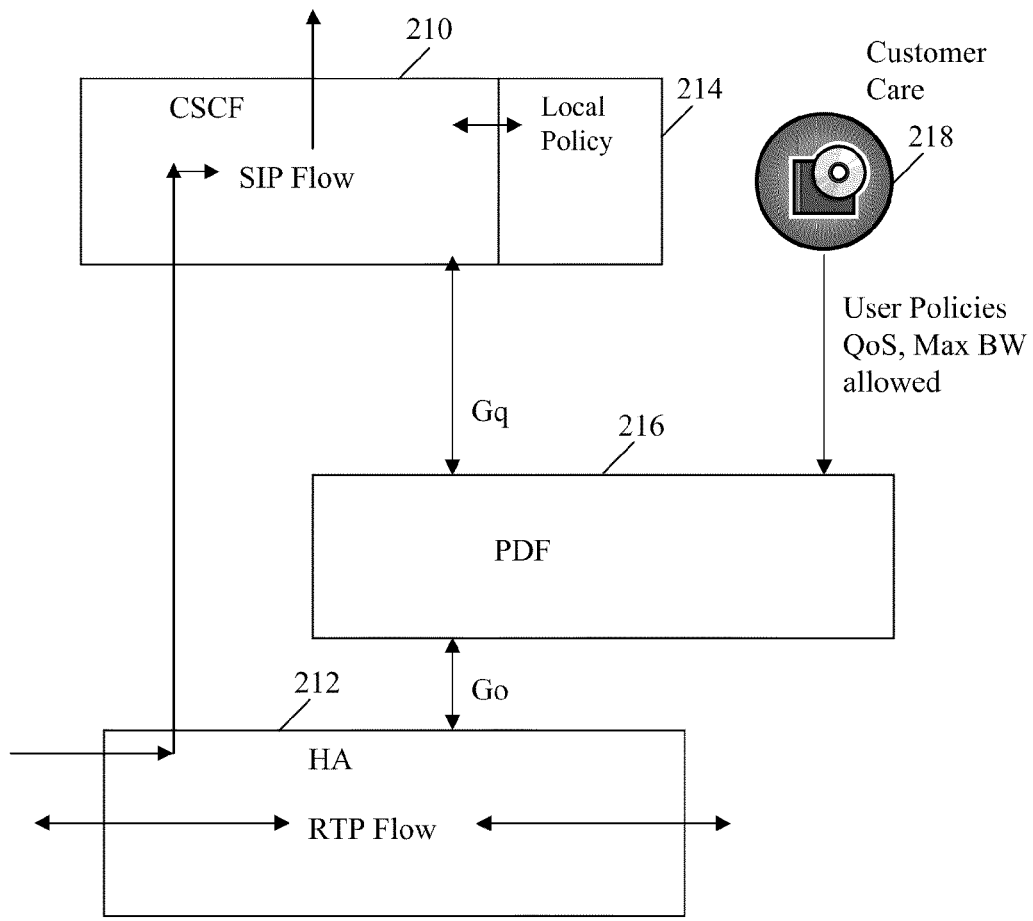
FIG. 2 is a diagram of an external policy decision function (PDF) used in conjunction with packet data transmissions in accordance with certain embodiments.

FIG. 2 illustrates an embodiment where an external policy decision function (PDF) is provided. FIG. 2 includes a CSCF 210, a HA 212, a local policy 214, and a PDF 216. These functions can be provided on one or more network devices as is described below. To address overall QoS, CSCF 210 interacts with a policy enforcement point (not shown) though PDF 216. Flow authorization is negotiated with the policy enforcement point (PEP), which can be implemented on a HA or a gateway GPRS support node (GGSN), for example. Later when the user initiates a flow, the PEP can send a message to CSCF 210 or PDF 216 to check the flow matches the negotiated media.

A PDF can be used to execute various policies at the user level. For example, a user could have a rate limit service that limits the bandwidth to 512 kbps or a user can have low quality voice service only. To enforce such policies, an external PDF is used with interface coupled to customer care 218. PDF 216 also caters to other application functions (like CSCF 210), such as a web proxy, a gaming proxy, etc. The application functions interface with PDF 216 to get authorization for user traffic flows.

Figure 3:
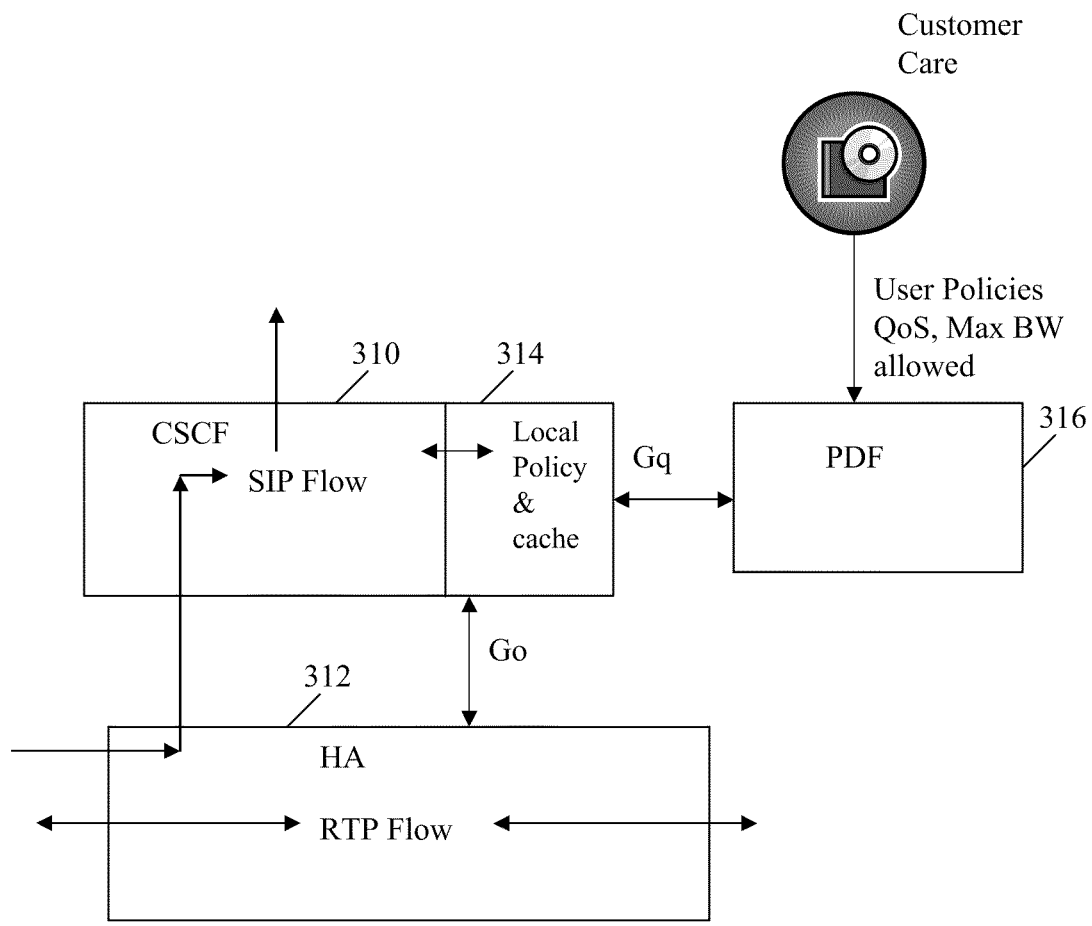
FIG. 3 is a diagram of a policy proxy is implemented with a cache used in conjunction with packet data transmissions in accordance with certain embodiments.

FIG. 3 illustrates an embodiment where a policy proxy is implemented with a cache. FIG. 3 includes a CSCF 310, a HA 312, a local policy and cache 314, and a PDF 316. These functions can be provided on one or more network devices as is described below. Local policy and cache 314 act like a policy proxy. The cache keeps user policy information. The user policy in the cache can have a limited life time. If there is a change in the user policy at PDF 316, PDF 316 informs CSCF 310 to erase the user record in the cache. This forces a query to PDF 316 to retrieve updated user policy information.

Figure 4:
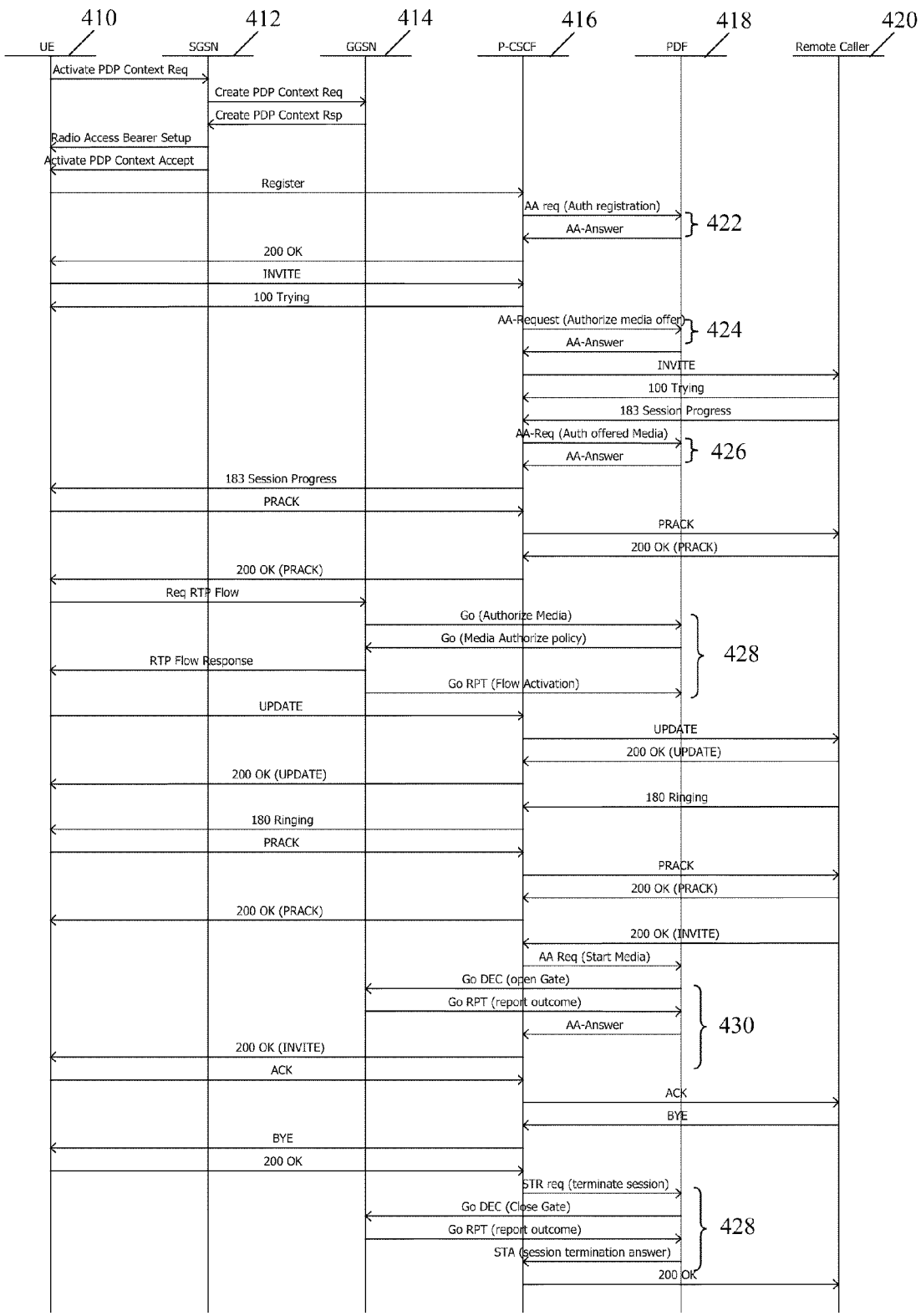
FIG. 4 is a messaging diagram of a session setup and teardown with an external PDF in accordance with certain embodiments.

FIG. 4 illustrates a session setup and teardown with an external PDF in accordance with certain embodiments. FIG. 4 includes some functions such as user equipment (UE) 410, a serving GPRS support node (SGSN) 412, a gateway GPRS support node (GGSN) 414, a proxy-call session control function (P-CSCF) 416, a policy decision function (PDF) 418, and a remote caller 420. User equipment 410 can be a mobile node and remote caller 420 can also be a server or other content provider. Messaging 422 is to authorize the registration of UE 410 and includes the sending of an AA-request (AAR) message and an AA-answer (AAA) message. Messaging 424 is to authorize a media request and message 426 is to authorize the media offered. Messaging 428 is to authorize media and media delivery on the network. Messaging 430 is to start the media flow and to check policy enforcement. Messaging 432 is to terminate a media session.

Figure 5:
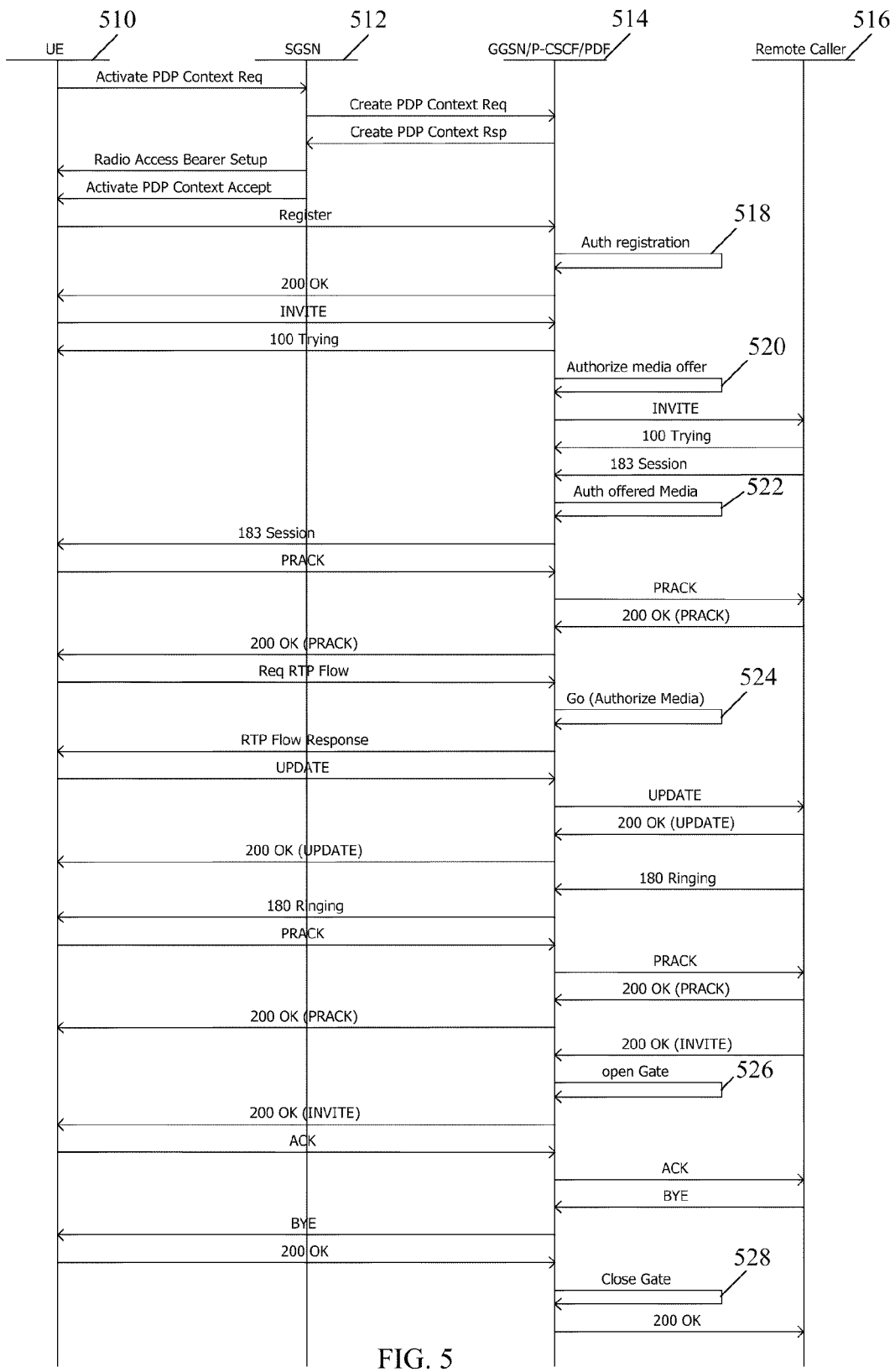
FIG. 5 is a messaging diagram a session startup and teardown with a policy proxy in accordance with certain embodiments.

FIG. 5 illustrates a session startup and teardown with a policy proxy in accordance with certain embodiments. The policy proxy can be implemented as shown in FIG. 3. FIG. 5 includes some functions such as UE 510, SGSN 512, GGSN/P-CSCF/PDF 514, and remote caller 516. In FIG. 5, the policy proxy, which is shown in GGSN/P-CSCF/PDF 514, handles messaging that would otherwise be sent to an external PDF. Messaging 518, 520, 522, 524, 526, and 528 are handled locally by the policy proxy instead of an external PDF as shown in FIG. 4 in messaging 422, 424, 426, 428, 430, and 432. The messaging that is handled locally by the policy proxy can use information stored in the cache to make policy decisions about authorizing media and setting up flows. The policy proxy can also track sessions and flows for billing purposes in some embodiments.

Figure 6:
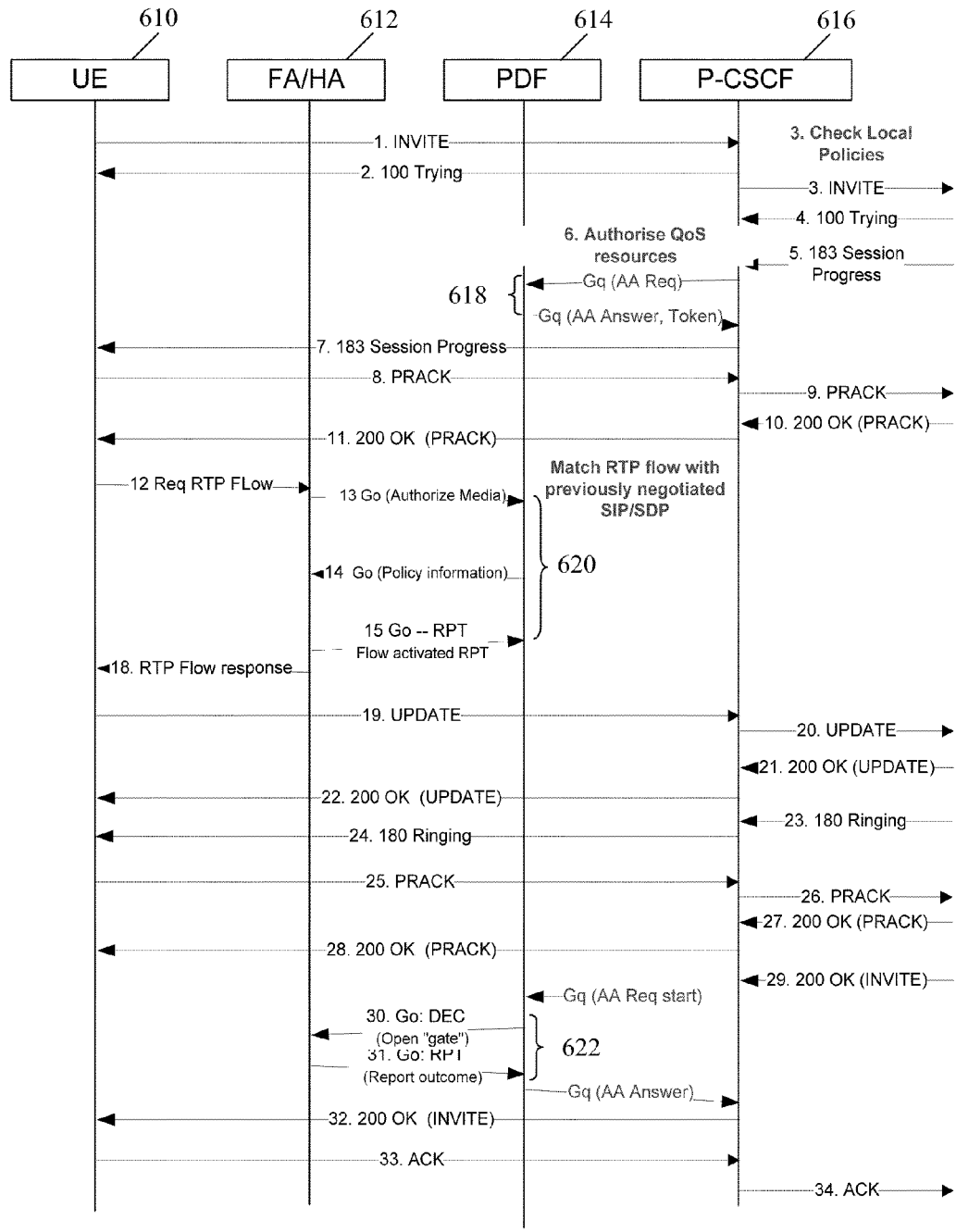
FIG. 6 is a messaging diagram of an external PDF for a session startup in a network in accordance with certain embodiments.

FIG. 6 shows an external PDF message flow for a session startup in a CDMA 2000 network in accordance with certain embodiments. FIG. 6 includes some functions such as UE 610, Foreign Agent/Home Agent (FA/HA) 612, PDF 614, and P-CSCF 616. Messaging 618 is to authorize QoS resources. Messaging 620 is to match the data flow with policy parameters. Messaging 622 begins the data flow and reports on the delivery of the media. In some embodiments, PDF 614 is replaced by a policy and charging rules function (PCRF).

Figure 7:
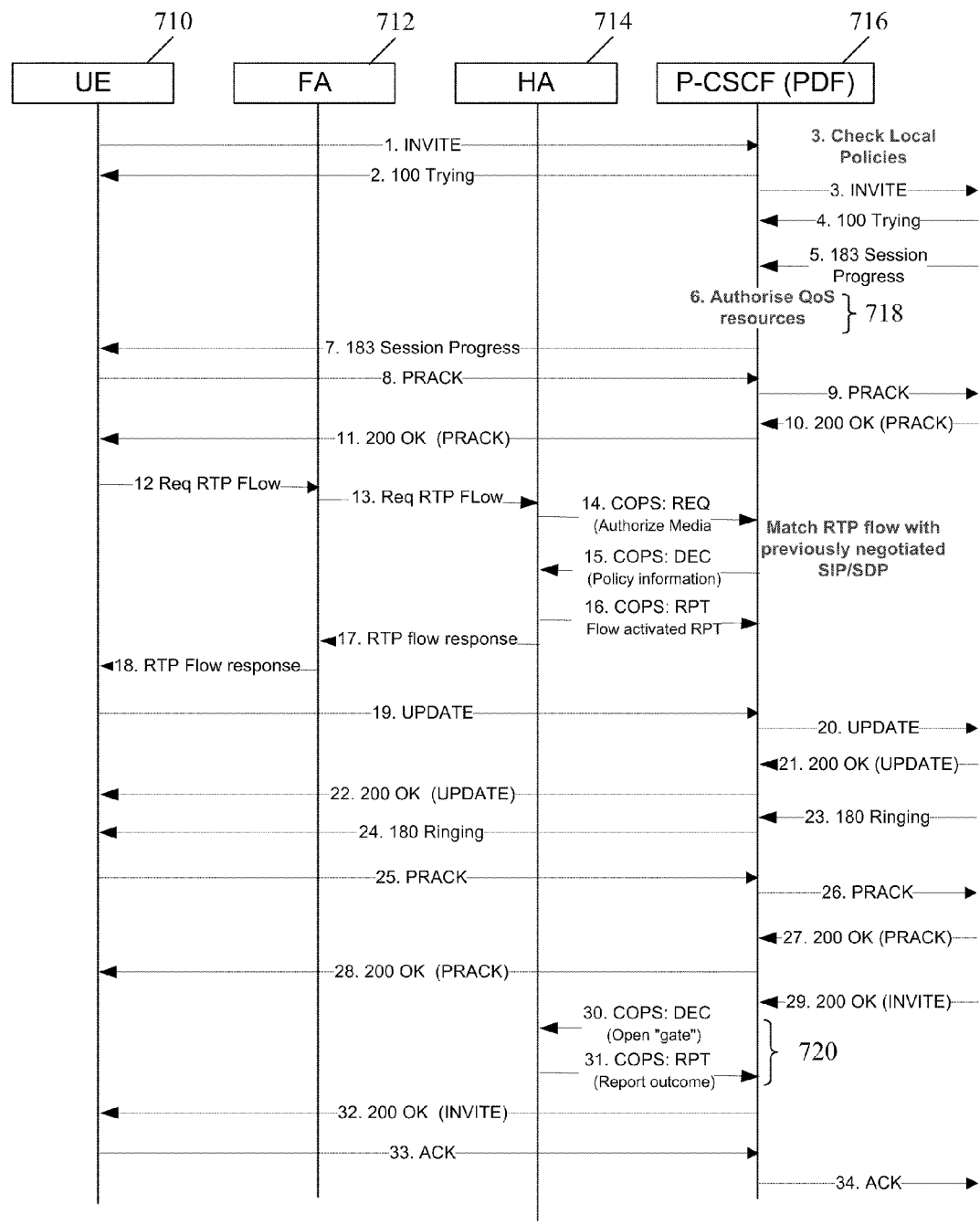
FIG. 7 is a messaging diagram an policy proxy for a session startup in a network in accordance with certain embodiments.

FIG. 7 illustrates a policy proxy message flow for a session startup in a CDMA 2000 network in accordance with certain embodiments. FIG. 7 includes some functions such as UE 710, foreign agent (FA) 712, HA 714, P-CSCF 716. P-CSCF 716 includes a policy proxy that is implemented in a cache that stores user policy information. This allows P-CSCF 716 to authorize QoS resources 718 through the policy proxy in many instances rather than an external PDF (not shown). Messaging 720 to begin the media flow can be completed with the policy proxy rather than having to contact the external PDF. The policy proxy implemented in P-CSCF 716 provides a reduction in the messaging necessary for session startup and provides for a reduction in the latency for session startup and session teardown. The reduction in the latency comes in part because it is quicker to determine the policy with a policy proxy because the information is stored locally in the policy proxy. Otherwise, messaging over the network needs to occur to fetch the information.

Figure 8:
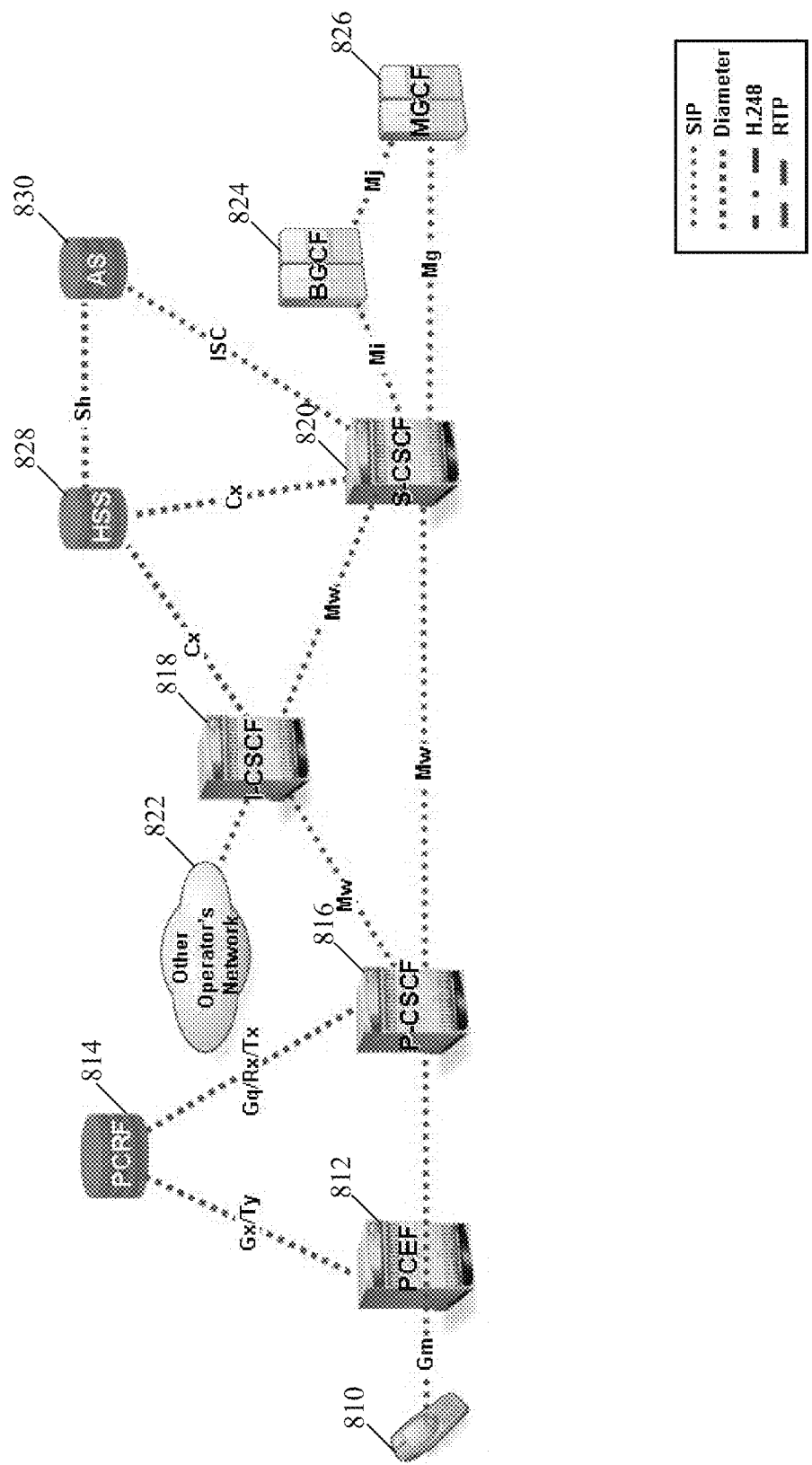
FIG. 8 is a diagram of a network topology deploying various functions in accordance with certain embodiments.

FIG. 8 illustrates a network topology deploying various functions in accordance with certain embodiments. FIG. 8 includes a mobile node 810, a policy charging and enforcement function (PCEF) 812, a policy control and charging rules function (PCRF) 814, a P-CSCF 816, an Interrogating-Call Session Control Function (I-CSCF) 818, a Serving-Call Session Control Function (S-CSCF) 820, other operator's network 822, breakout gateway control function (BGCF) 824, media gateway control function (MGCF) 826, a home subscriber server (HSS) 828, and an AS 830. PCEF 812 can be implemented on a network device and on a function such as a Gateway, a GGSN, a packet data gateway (PDG), a packet data interworking function (PDIF), a packet data serving node/home agent (PDSN/HA), or an ASN gateway. In some embodiments, P-CSCF 816 and the policy proxy can be implemented on the same network device. In other embodiments, P-CSCF 816, PCEF 812, and the policy proxy can be implemented on the same network device.

PCEF 812 is located at the gateway, which can be a GGSN, a packet data gateway (PDG), a packet data gateway interworking function (PDIF), a PDSN/HA, and/or an access service network gateway (ASN GW). The PCEF 812 provides service data flow detection and counting as well as online and offline charging interactions. The PCEF 812 can also provide policy enforcement toward the internet protocol-connectivity access network (IP-CAN). PCRF 814 combines flow based charging control and a policy decision function. The PCRF 814 can provision policy and charging control (PCC) rules to the PCEF 812 and inform the application function (AF) on the network device of traffic plane events. The Proxy-CSCF 816 can serve as the first contact point for the user equipment (UE) 810 and forward SIP messages in the network. P-CSCF 816 generates charging call-detail records, maintains a security association with UE 810, and authorizes bearer resource quality of service (QoS) through the application function (AF) toward the PCRF 814. P-CSCF 816 can also provide local service (e.g., 411 service and emergency service), lawful interception, and SIP header compression.

Interrogation-CSCF 818 serves as the first contact between different operator's networks, in some embodiments. The I-CSCF 818 also forwards SIP messages through the network, assigns S-CSCFs to sessions, generates charging call-detail records (CDRs), and provides topology hiding for the network. The Serving-CSCF 820 acts as a SIP registrar and provides IMS user authentication. The S-CSCF 820 loads IMS user profiles from the home subscriber server (HSS), provides person to person (P2P) and person to application (P2A) session control, and SIP application server service control. The S-CSCF 820 provides address translation support, generation of charging CDRs, and lawful interception.

Figure 9:
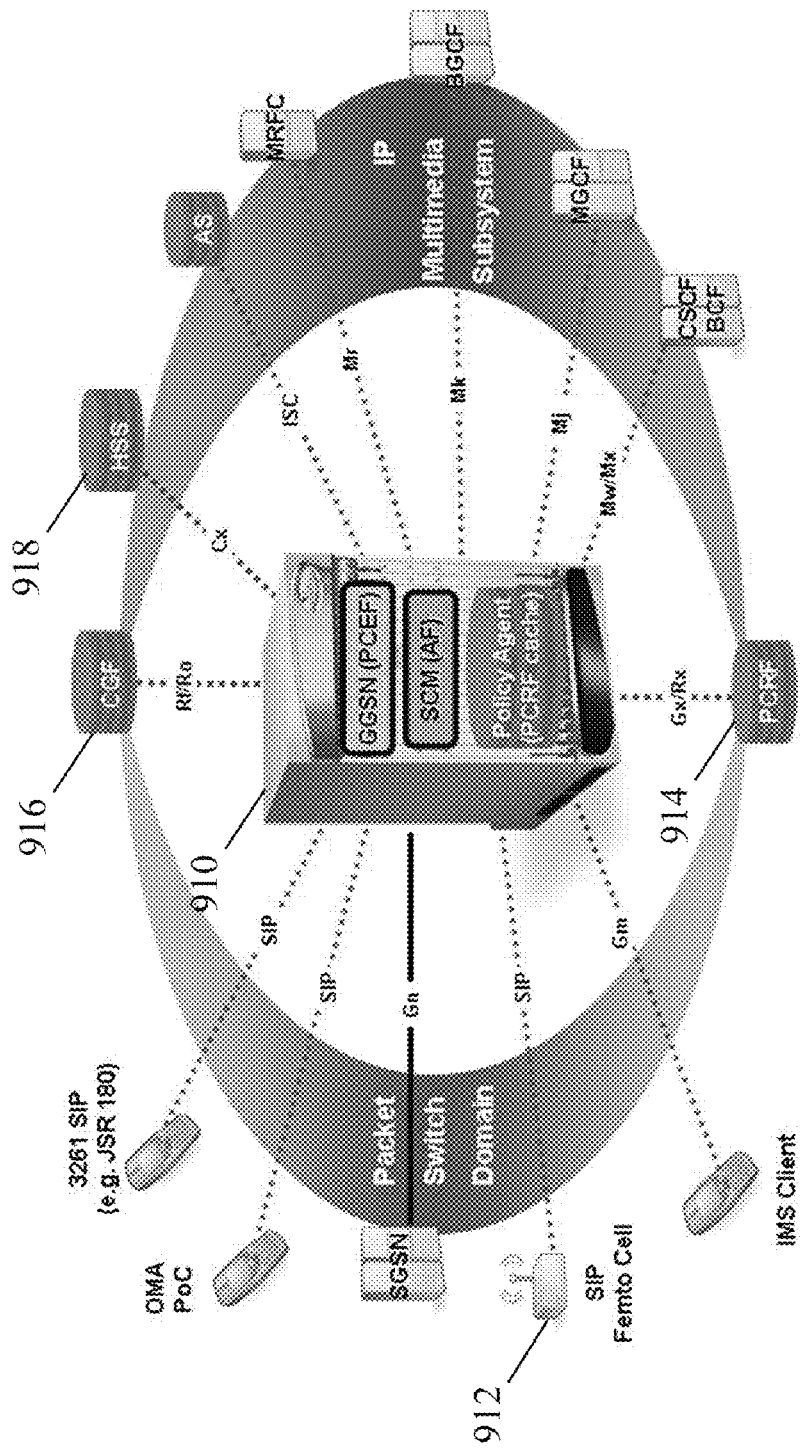
FIG. 9 is a diagram of a network device implementing multiple function in accordance with certain embodiments.

FIG. 9 illustrates a network device 910 and various devices with which network device communicates in certain embodiments. As shown, network device 910 can host a number of functions such as GGSN, PCEF, an application function (AF) running in a session control manager (SCM), and a policy agent or policy proxy. The network device 910 can also communicate with a number of other devices in the packet switch domain and the IP multimedia subsystem (IMS) domain. In the packet switch domain the network device 910 can communicate with a Femto cell 912 that can be placed in a mobile subscriber's home to enable user equipment service with a wireless service provider. The femto cell 912 can use a broadband connection to relay the communications to the network device 910. User equipment can also communicate with network device 910 using a variety of protocols such as session initiation protocol (SIP), Gn, and Gm. Network device 910 also communicates with PCRF 914 using a Gx/Rx protocol and charging gateway function (CGF) 916 using Rf/Ro protocols. The network device 910 can communicate with HSS 918. HSS 918 can provide information used for the support, establishment, and maintenance of calls and sessions made by subscribers.

In some embodiments, the network device also hosts CSCF functions on the same network device as the functions being hosted on network device 910. This can simplify policy and charging control (PCC) architecture that is promulgated by the 3rd generation partnership project (3GPP) and 3rd generation partnership project 2 (3GPP2). The policy proxy can support local policy and dynamic network policy to provide a virtual PCRF capability. For dynamic policy, a policy cache which utilizes standard PCC interfaces to learn policy information, and this policy information is utilized locally to reduce or eliminate signaling events between PCRF and PCEF or PCRF and AF (P-CSCF). When the policy proxy is coupled with a GGSN or PDSN and a P-CSCF, the policy proxy can reduce the signaling message interaction between these elements.

The Policy and charging control rule (PCC rule) includes information that is used to enable the user plane detection of, the policy control and proper charging for a service data flow. The packets detected by applying the service data flow template are designated a service data flow. Two different types of PCC rules exist: Dynamic rules and predefined rules. The dynamic rules are provisioned by the PCRF via the Gx reference point (see FIG. 8), while the predefined rules are pre-configured in the PCEF. There are defined procedures for activation, modification and deactivation of PCC rules. The PCRF may activate, modify and deactivate a PCC rule at any time, over the Gx reference point. The modification procedure is applicable to dynamic PCC rules only, in some embodiments. The operator may define a predefined PCC rule for activation by the PCEF on every Internet Protocol-Connectivity Access Network (IP-CAN) bearer to that access point. The table below identifies information included in a PCC rule.

| Information name | Description | PCRF can modify a dynamic PCC rule in PCEF |
|---|---|---|
| Rule identifier | Uniquely identifies the PCC rule, within an IP-CAN session. It is used between PCRF and PCEF for referencing PCC rules. | no |
| Service data flow detection | This section defines the method for detecting packets belonging to a service data flow. | |
| Precedence | Determines the order, in which the service data flow templates are applied at service data flow detection. | yes |
| Service data flow template | A list of service data flow filters for the detection of the service data flow. | yes |
| Charging | This section defines identities and instructions for charging and accounting that is used for an access point where flow based charging is configured | |
| Charging key | The charging system (OCS or OFCS) uses the charging key to determine the tariff to apply for the service data flow. | yes |
| Service identifier | The identity of the service or service component the service data flow in a rule relates to. | yes |
| Charging method | Indicates the required charging method for the PCC rule. Values: online, offline or neither. | no |
| Measurement method | Indicates whether the service data flow data volume, duration or both shall be measured. This is applicable for reporting, regardless the charging method. | yes |
| Application Function Record Information | An identifier, provided from the AF, correlating the measurement for the Charging key/Service identifier values in this PCC rule with application level reports. | no |
| Service identifier level reporting | Indicates that separate usage reports shall be generated for the Service identifier. Values: mandated or not required | Yes |
| Policy control | This section defines how the PCEF shall appy policy control for the service data flow. | |
| Gate status | The gate status indicates whether the service data flow, detected by the service data flow template, may pass (Gate is open) or shall be discarded (Gate is closed) at the PCEF. | Yes |

| Information name | Description | PCRF can modify a dynamic PCC rule in PCEF |
|---|---|---|
| QoS class identifier | The authorized QoS class for the service data flow | Yes |
| UL-bitrate | The uplink bit-rate authorized for the service data flow | Yes |
| DL-bitrate | The downlink bit-rate authorized for the service data flow | Yes |

The PCC Rule identifier can be unique for a PCC rule within an IP-CAN session. A dynamically provided PCC rule that has the same Rule identifier value as a predefined PCC rule replaces the predefined rule within the same IP-CAN session. The PCC Service data flow template may comprise any number of Service data flow filters. A Service data flow filter contains information for matching user plane packets. A Service data flow filter, provided from the PCRF, includes information elements for matching against an IP tuple. The Service data flow template filtering information within an activated PCC rule is applied at the PCEF to identify the packets belonging to a particular service data flow. Predefined PCC rules may include service data flow filters, which support extended capabilities, including enhanced capabilities to identify packets associated with application protocols.

The PCC Precedence defines in what order the activated PCC rules within the same IP-CAN session are applied at the PCEF for service data flow detection. When a dynamic PCC rule and a predefined PCC rule have the same precedence, the dynamic PCC rule takes precedence. The PCC Charging key is the reference to the tariff for the service data flow. Any number of PCC Rules may share the same charging key value. The charging key values for each service can be configurable. The PCC Service identifier identifies the service. PCC Rules may share the same service identifier value. The service identifier provides the most detailed identification, specified for flow based charging, of a service data flow. The PCC Charging method indicates whether online charging is required, offline charging suffices or the service data flow is not subject to any end user charging.

The PCC Measurement method indicates what measurements apply for charging for PCC rule. The PCC Service Identifier Level Reporting indicates whether the PCEF generates reports per Service Identifier. The PCEF can accumulate the measurements from all PCC rules with the same combination of Charging key/Service identifier values in a single report. The PCC Application function record information identifies an instance of service usage. A subsequently generated usage report, generated as a result of the rule, may include the Application function record information, if available. The Application Function Record Information may include the AF Charging Identifier and/or the Flow identifiers. The report is however not restricted to include only usage related to the Application function record information reported, as the report accumulates the usage for all PCC rules with the same combination of Charging key/Service identifier values. If exclusive charging information related to the Application function record information is used, the PCRF can provide a service identifier, not used by any other PCC rule of the IP-CAN session at this point in time, for the AF session. For example, the PCRF may be configured to maintain a range of service identifier values for each service which, use exclusive per instance charging information. Whenever a separate counting or credit management for an AF session is used, the PCRF selects a value, which is not used at this point in time, within that range. The uniqueness of the service identifier in the PCEF ensures a separate accounting/credit management while the AF record information identifies the instance of the service.

The PCC Gate indicates whether the PCEF lets a packet matching the PCC Service data flow template, pass through (gate is open) the PCEF or the PCEF shall discard (gate is closed) the packet. The QoS Class Identifier indicates the authorized QoS class for the service data flow. The UL-bitrate indicates the authorized bitrate for the uplink component of the service data flow. The interpretation of the bitrate depends on the QoS class and the IP-CAN. The DL-bitrate indicates the authorized bitrate for the downlink component of the service data flow. The interpretation of the bitrate depends on the QoS class and the IP-CAN.

Figure 10:
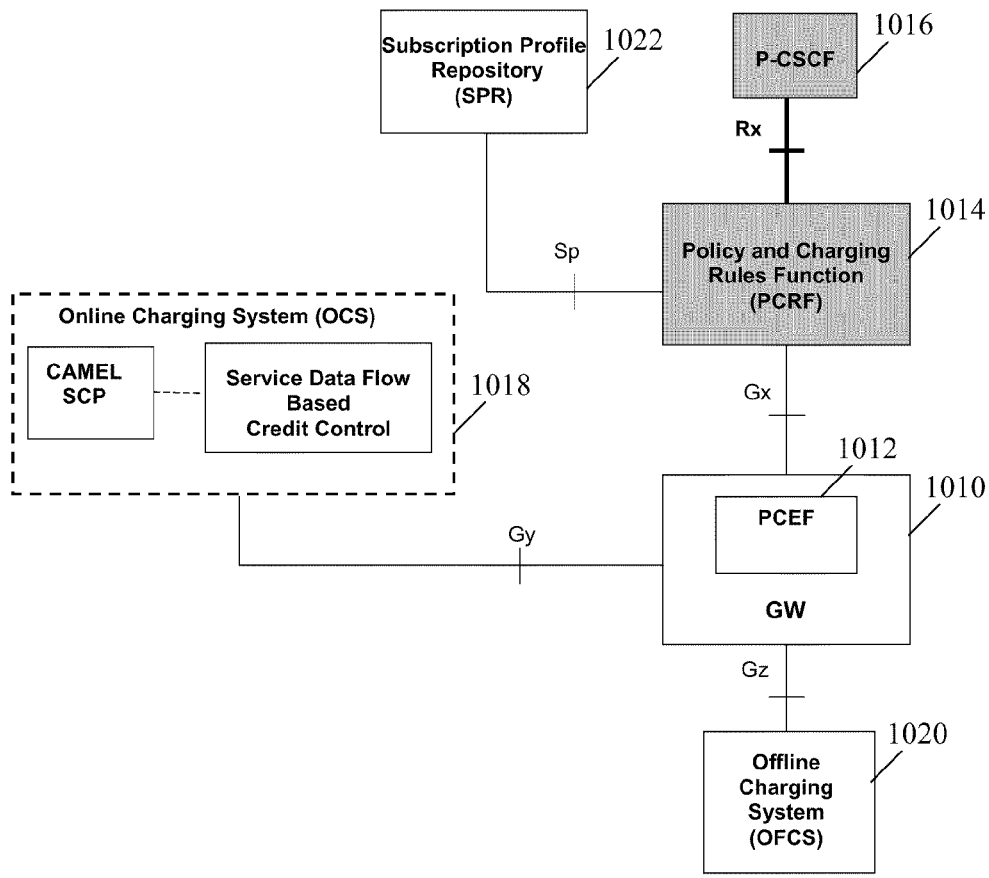
FIG. 10 is a diagram of a 3GPP policy and charging control (PCC) architecture.
Figure 11:
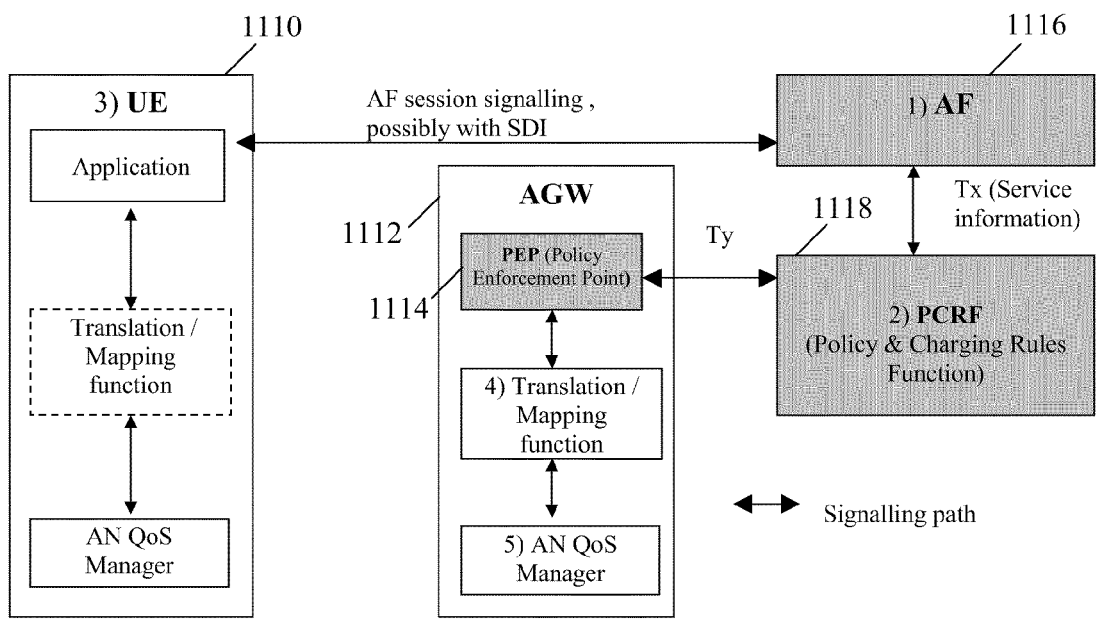
FIG. 11 is a diagram of multimedia domain (MMD) policy and charging control (PCC) architecture.

FIG. 10 illustrates a diagram of a 3GPP policy and charging control (PCC) architecture. The PCC architecture includes a gateway 1010, a PCEF 1012, a PCRF 1014, a P-CSCF 1016, an online charging system (OCS) 1018, an offline charging system (OFCS) 1020, and a subscription profile repository (SPR) 1022. In some embodiments, a network device can integrate the PCEF 1012, gateway 1010, P-SCCF 1016, and aspects of the PCRF 1014 in one device. FIG. 11 illustrates a diagram of multimedia domain (MMD) policy and charging control (PCC) architecture. The architecture of FIG. 11 includes user equipment 1110, access gateway (AGW) 1112 which includes a policy enforcement point (PEP) 1114, an application function (AF) 1116, and a PCRF 1118. In some embodiments, a network device can integrate the AGW 1112, the PEP 1114, the AF 1116, and aspects of the PCRF 1118.

Figure 12:
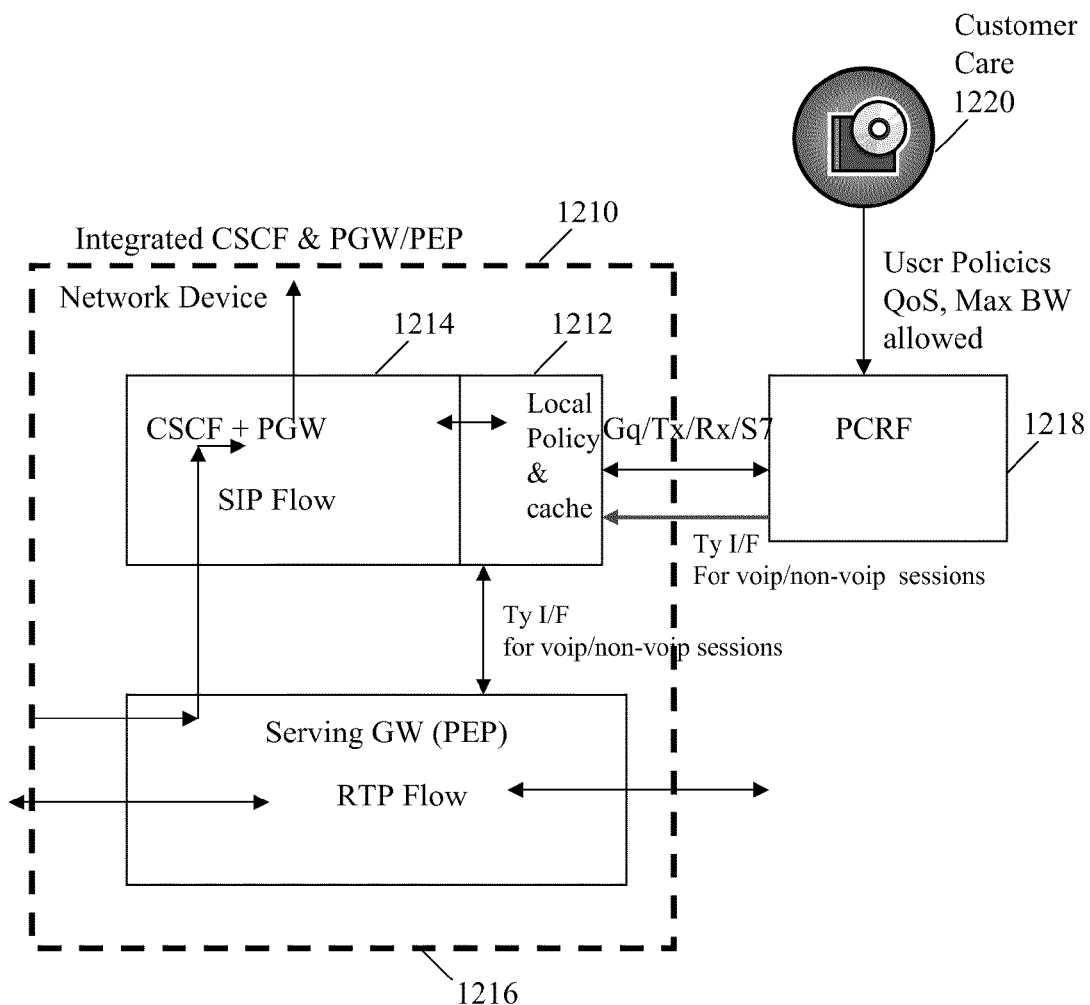
FIG. 12 is a diagram of a 4th generation implementation of an integrated network device in accordance with certain embodiments.

FIG. 12 illustrates a 4th generation ready network device and signaling with a in accordance with certain embodiments. FIG. 12 includes a network device 1210, a local policy agent 1212, a CSCF and PDN gateway (PGW) 1214, a Serving Gateway 1216, a PCRF 1218, and customer care 1220. The serving gateway 1216 provides interworking from one access mode to another access mode, management of accounting, authorization, and authentication, a policy enforcement point, and security and packet screening. The PGW 1214 controls IP data services, serves as an anchor point for various access technologies, allocates IP addresses, enforces policy, and provides access for non-3GPP access networks. The policy agent 1212 can provide caching of policy and user profile information for the PGW 1214 and the serving gateway 1216 so that signaling and latency can be reduced. The policy agent 1212 can include many of the features discussed throughout this disclosure.

In some embodiments, the policy cache data can be implemented with a CSCF local cache. This cache can be a data store that is indexed on a per subscriber basis and stores registration specific information for a registered subscriber. For example, the cache may store QoS class information that represents the highest class that can be used for the media component and data rate information for the user. Various mechanisms can be used to maintain the cache integrity so that information does not become stale. In one embodiment, the subscriber's policy cache is flushed when the subscriber de-registers and/or re-registers so that the subscriber's policy information is synched up with the PCRF upon subscriber registration.

Figure 13:
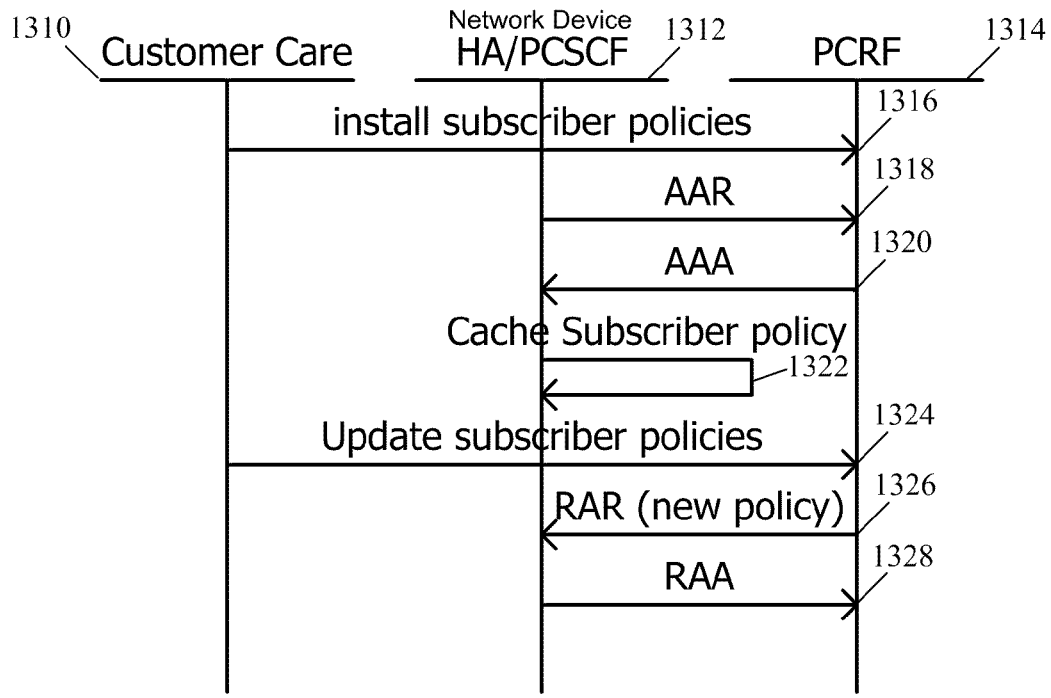
FIGS. 13 and 14 are messaging diagrams of a cache update in accordance with certain embodiments.
Figure 14:
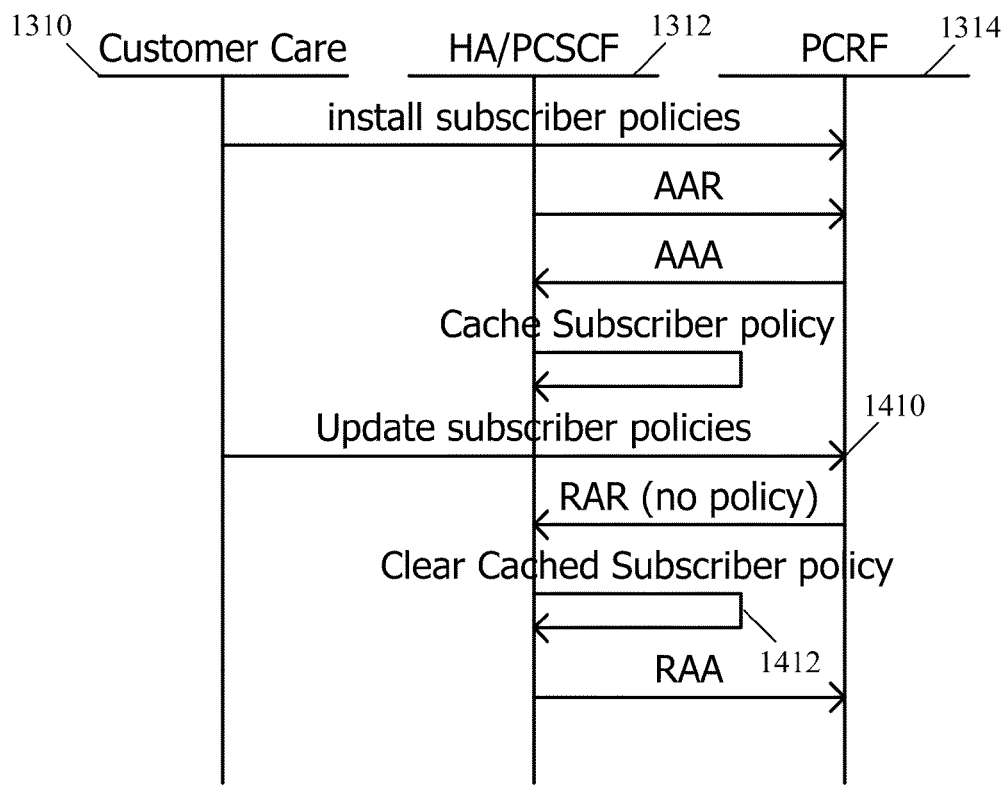

FIG. 13 illustrates a cache update from the PCRF in accordance with some embodiments. A customer care database 1310, a network device implementing a home agent (HA)/proxy call session control function (PCSCF) 1312, and a policy and charging rules function (PCRF) 1314 are shown in FIG. 13. In some embodiments, when PCRF 1314 is in operative communication with a customer care database 1310, the PCRF 1314 gets updated whenever the subscriber's service plan is updated. The customer care database 1310 sends an install subscriber policies message 1316 to the PCRF 1314. The HA/PCSCF 1314 sends a diameter authentication authorization request (AAR) message 1318 to PCRF 1314. PCRF 1314 sends an authentication authorization answer (AAA) message 1320. In 1322, HA/PCSCF 1312 caches the subscriber policies in the policy agent cache. In message 1324, customer care database 1310 sends an update subscriber policies message to PCRF 1314. PCRF 1314 sends HA/PCSCF 1312 a re-authorization request (RAR) message 1326 with a new policy. The RAR message 1326 sent by PCRF 1314 may or may not have newly updated subscriber policy. If the subscriber policy is not new, the HA/PCSCF 1312 can clear the subscriber cache so that the next session setup causes a cache miss and forces the HA/PCSCF 1312 to make an external AAR request to PCRF 1314. The HA/PCSCF 1312 can update the cache and send a re-authorization answer (RAA) 1328 to PCRF 1314. FIG. 14 illustrates an instance where a RAR message 1410 does not include new policy information. The HA/PCSCF 1312 clears the subscriber cache 1412 so that the next session setup introduces a cache miss and forces a request for the subscriber policy information.

Cache entries in the policy agent cache can also include an age that is associated with the entry. For example, the age is set to 1 day, i.e., the cache entry for a subscriber is flushed if it has not been refreshed for 1 day. After a cache entry is flushed, the network device can send the normal AA request (AAR) for the next session setup from that subscriber. An aging property further insures that stale information is not used. Another embodiment would clear a subscriber cache entry after every "n"th access. For example, "n" would be set to 100 so that after every 100 accesses since the last refresh, the cache entry is flushed. A combination of the two aging mechanisms may also be used to ensure adequate refreshing of the cache.

Figure 15:
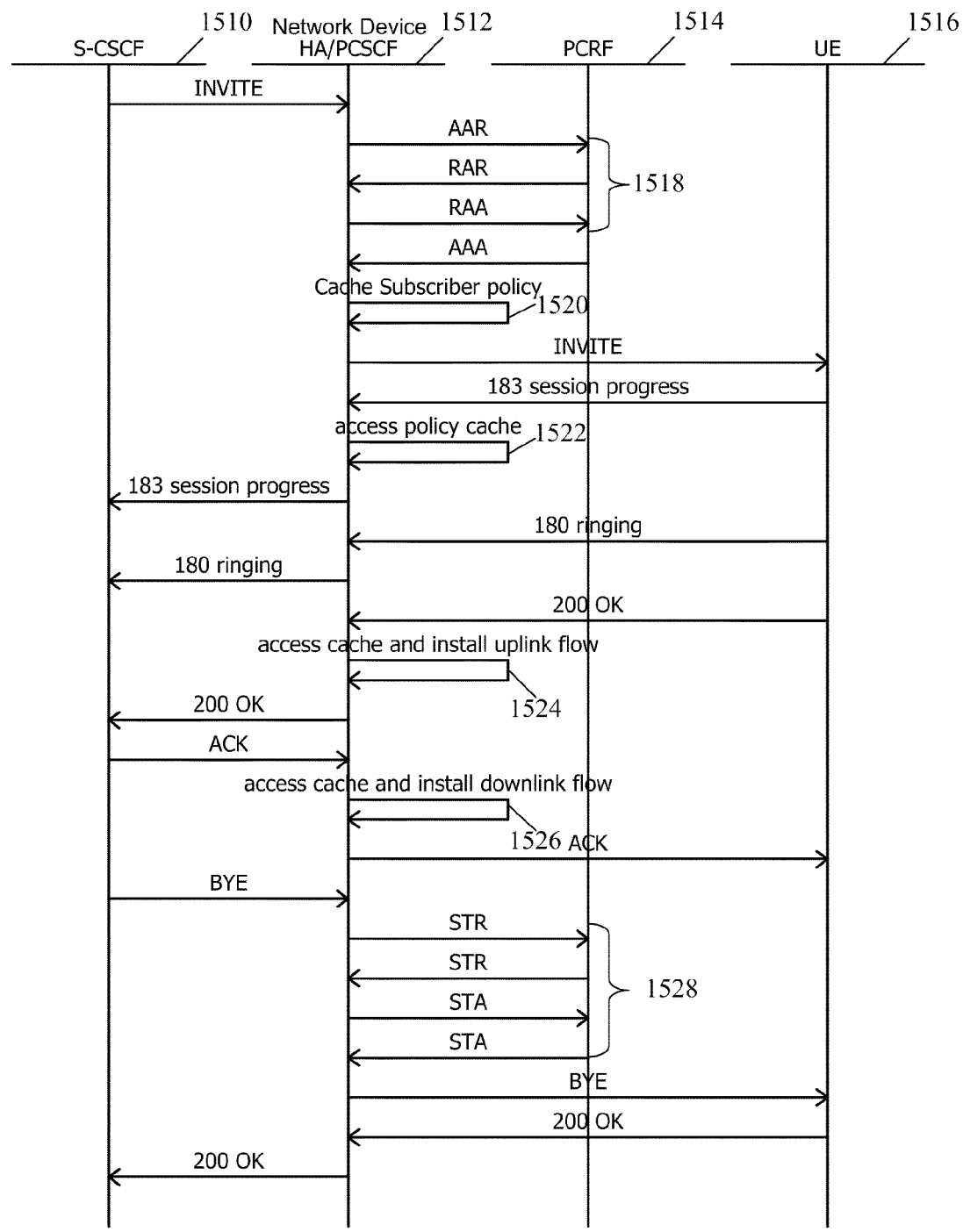
FIG. 15 is a messaging diagram of a first time call setup for a mobile terminated call in accordance with some embodiments.
Figure 16:
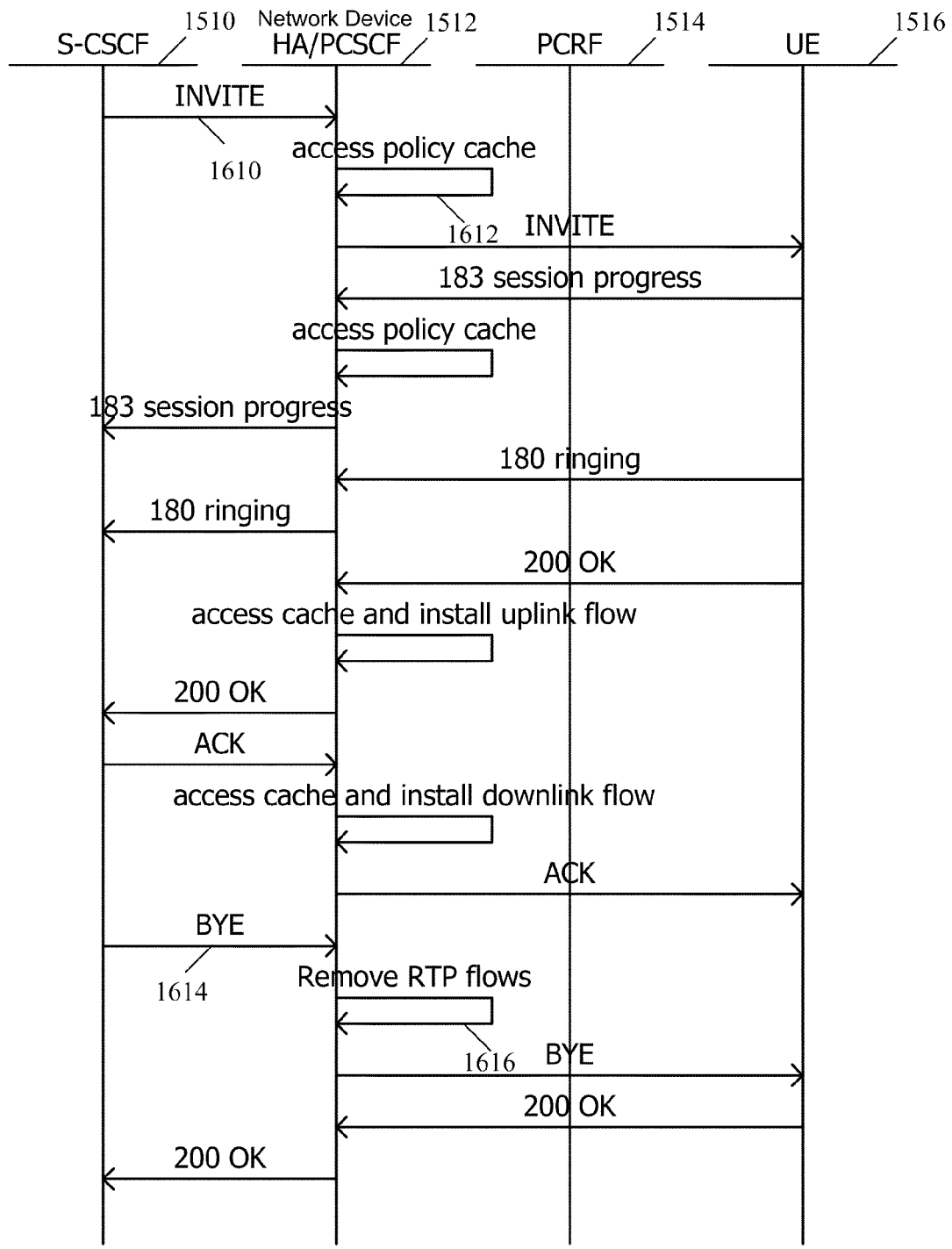
FIG. 16 is a messaging diagram of subsequent call setup signaling for a mobile terminated call in accordance with certain embodiments.

FIG. 15 illustrates a first time call setup for a mobile terminated call in accordance with some embodiments. FIG. 15 includes a serving-call session control function (S-CSCF) 1510, a network device implementing a HA/PCSCF 1512, a PCRF 1514, and user equipment (UE) 1516. After the first successful flow authorization from PCRF 1514 in 1518, the authorized QoS is cached for future use in 1520. HA/PCSCF 1512 can also keep track of total number flows and utilized QoS at any given time. In case the total aggregate authorized QoS turns out to exceed the subscription, media flow establishment is either denied or downgraded to best effort class. The access policy cache can be accessed in 1522 upon session start to obtain session startup information and verify any information. The access cache can also be used to track uplink flows 1524 and downlink flows 1526 and provide the levels of QoS that are provided for each flow. FIG. 16 illustrates subsequent call setup signaling for a mobile terminated call in accordance with certain embodiments. When HA/PCSCF 1512 receives invite message 1610 from S-CSCF 1510, the policy cache on the network device can be accessed in 1612 rather than messaging 1518 occurring (see FIG. 15). The policy information for the subscriber can be obtained locally rather than contacting the PCRF 1514. Similarly, when a termination event occurs, such as a bye message 1614, the local cache can be accessed in 1616 to retrieve and update information rather than contacting PCRF 1514 as in messaging 1528 (see FIG. 15). For example, on successful cache hit, the Tx and Ty messages are collapsed to internal messages within the network device in some embodiments. Messaging 1528 includes two session termination request (STR) messages and two session termination answer (STA) messages that are exchanged between HA/PCSCF 1512 and UE 1516.

Figure 17:
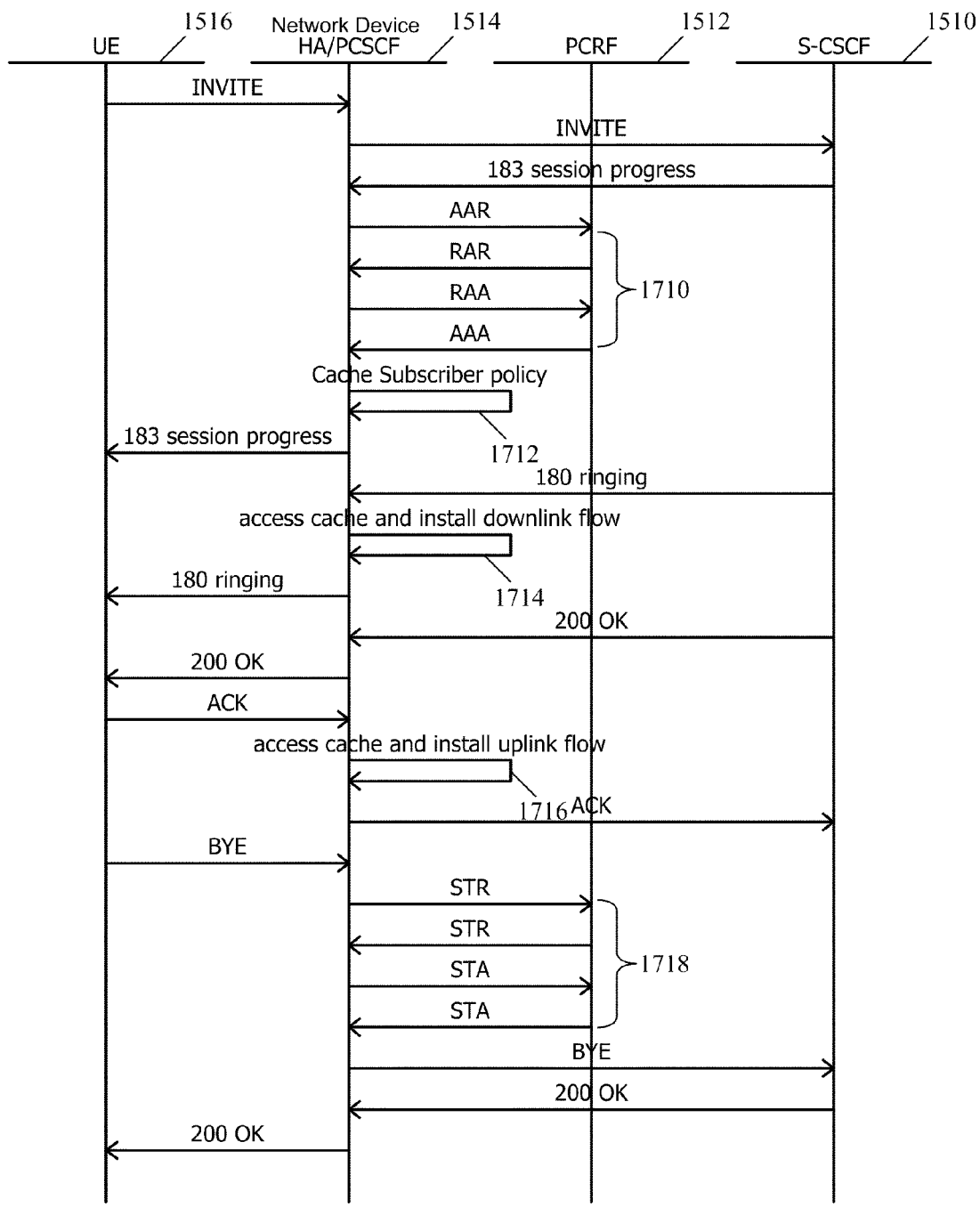
FIG. 17 is a messaging diagram of a first time call setup for a mobile originated call in accordance with some embodiments.
Figure 18:
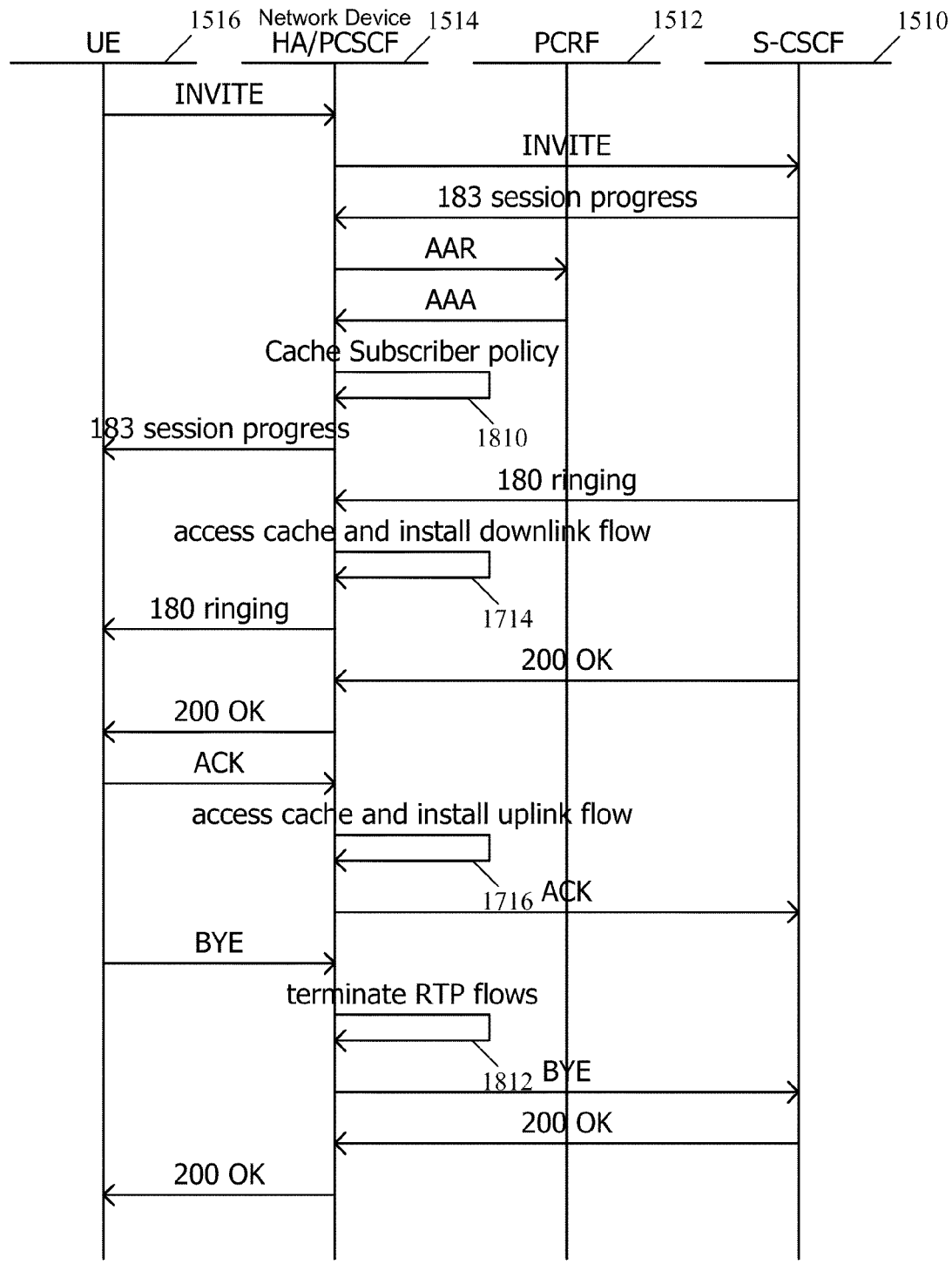
FIG. 18 is a messaging diagram of subsequent mobile calls with cache hits in accordance with certain embodiments.

FIG. 17 illustrates a first time call setup for a mobile originated call in accordance with some embodiments. In 1710 messaging occurs with PCRF 1512 to obtain policy information for a subscriber which is loaded into a cache on the network device implementing HA/PCSCF 1514 in 1712. In 1714 and 1716 the cache is accessed to install a downlink and uplink flow for the call. This can be similar to the installation of uplink and downlink flows 1524 and 1526. FIG. 18 illustrates subsequent mobile calls with cache hits in accordance with certain embodiments. In 1810, the subscriber policy can be cached locally. In 1812, the flows can be terminated locally rather than communicating with PCRF 1512 to terminate the flows as in messaging 1718.

IP Multimedia Subsystem (IMS) and Multimedia Domain (MMD) provide end-to-end QoS via RSVP to co-exist with SBLP. SBLP can be used to control QoS provided to a combined set of IP flows and includes policy-based admission control applied to the bearer associated with flows. Policy-based admission control ensures that resources used by a particular set of IP flows are within the resources specified. This can include the Go interface in some embodiments. A gate can be used to enforce policies in the user plane. An open gate allows the packets to flow, while a closed gate caused packets to be dropped. RSVP is used by a host to request specific QoS from the network for application data streams or flows. RSVP can be used to deliver QoS requests to all devices along the path of the flows and to establish and maintain the requested level of service. Due to RSVP and SBLP modifying resource usage for flows on the network, the policy cache can be updated or checked when messages associated with these protocols are received at the network device.

Figure 19:
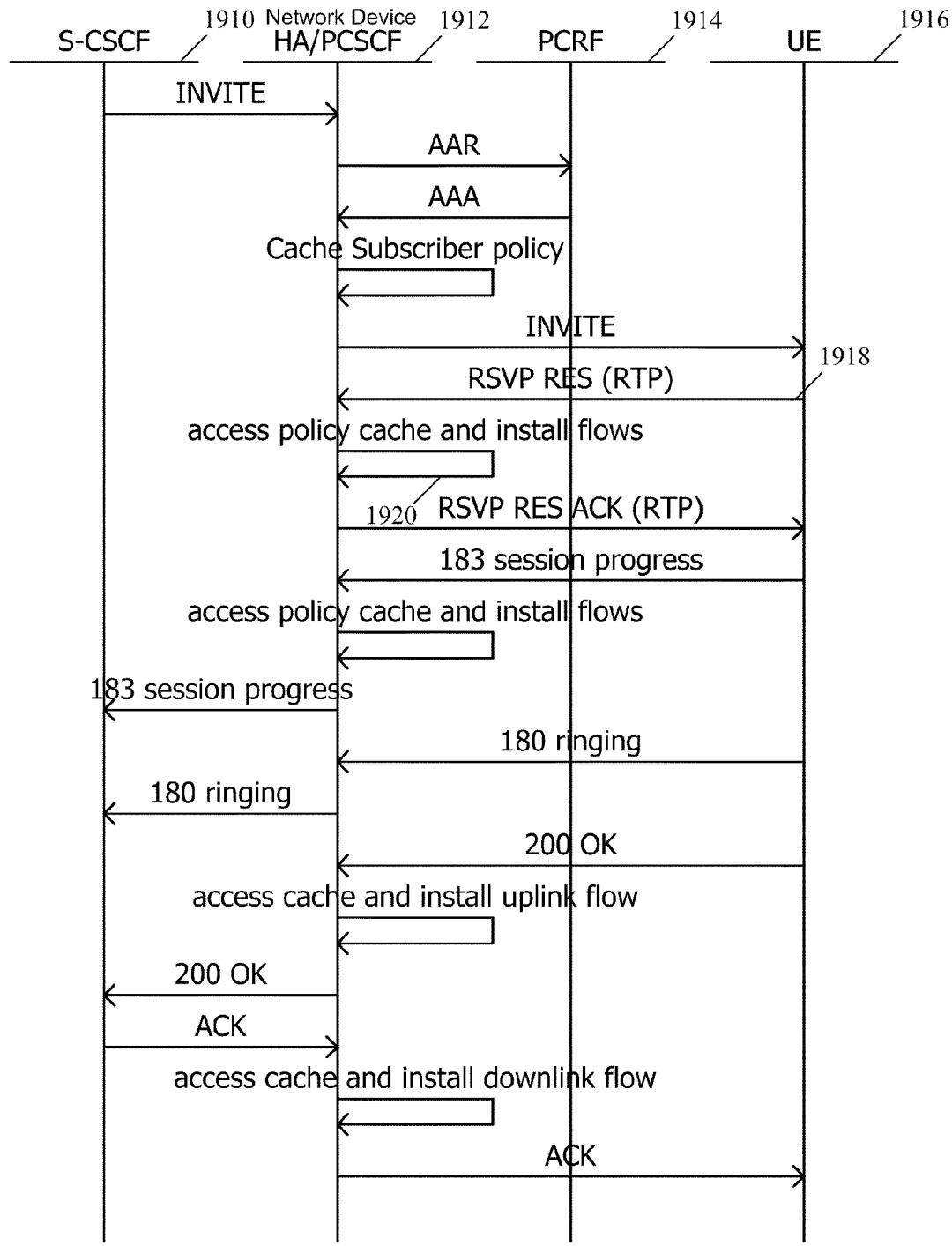
FIG. 19 is a messaging diagram of a mobile terminating call setup flow using resource reservation protocol (RSVP) co-existing with service based local policy (SBLP) in accordance with some embodiments.
Figure 20:
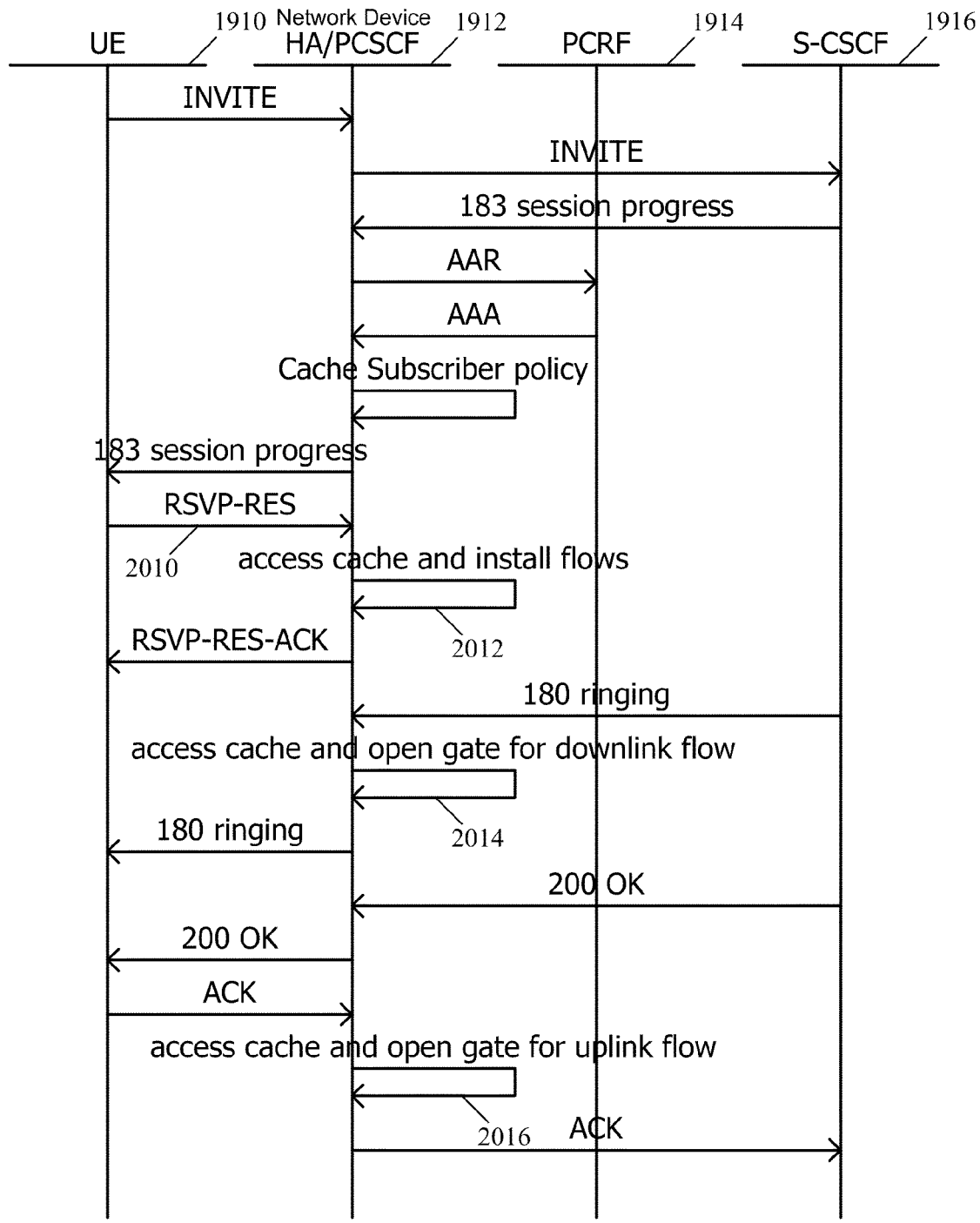
FIG. 20 is a messaging diagram of a mobile originating call setup flow using RSVP with SBLP in accordance with certain embodiments.

FIG. 19 illustrates a signaling diagram for a mobile terminating call setup flow using resource reservation protocol (RSVP) co-existing with service based local policy (SBLP) in accordance with some embodiments. FIG. 19 includes a serving call session control function (S-CSCF) 1910, a network device implementing a home agent (HA)/proxy call session control function (PCSCF) 1912, a policy and charging rules function (PCRF) 1914, and user equipment (UE) 1916. FIG. 19 illustrates how UE 1916 initiated RSVP reservation messages interact with P-CSCF 1912 policy control. In some embodiments, UE 1916 can use RSVP to request QoS for auxiliary flows (for example, real-time transport protocol (RTP) in FIG. 19). A RSVP RES message 1918 can trigger a policy cache access and an installation of flows in 1920. FIG. 20 illustrates a signaling diagram for a mobile originating call setup flow using RSVP with SBLP in accordance with certain embodiments. As shown, a RSVP RES message 2010 can trigger a policy cache access and an installation of flows in 2012. The policy agent cache can also be used to open and close gates for downlink flows as in 2014 and for uplink flows as in 2016.

Figure 21:
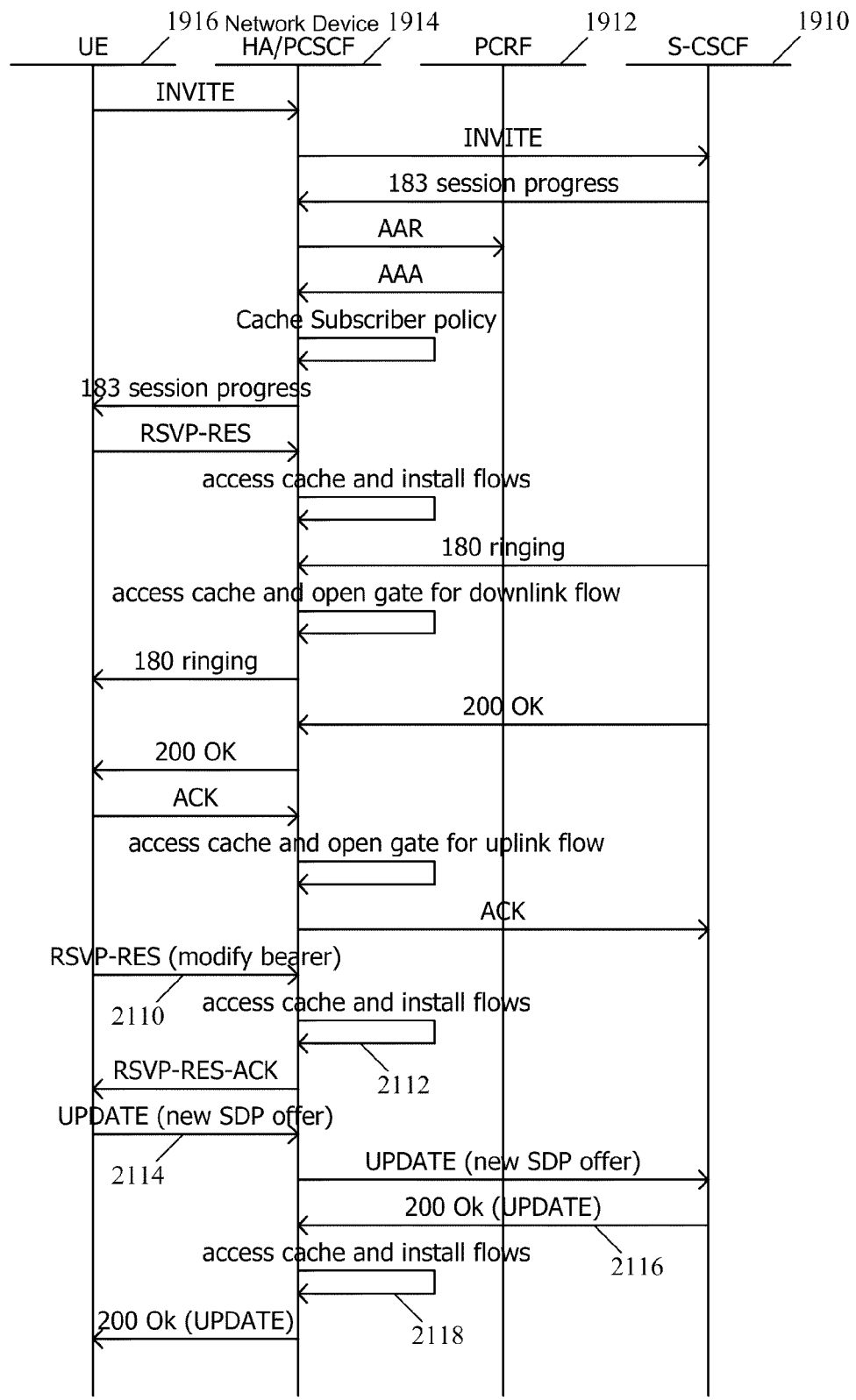
FIG. 21 is a messaging diagram of a mid session bearer update using RSVP and SBLP in accordance with some embodiments.

FIG. 21 illustrates a signaling diagram for a mid session bearer update using RSVP and SBLP in accordance with some embodiments. A mid session bearer update occurs with a RSVP RES message 2110 that includes information regarding the bearer modifications. The RSVP RES message 2110 can trigger a local policy cache access and update of information or installation of flows in 2112. A session description protocol (SDP) update from UE 1916 can be used to modify a multimedia communication session and SDP is used to describe steaming media parameters. A 200 ok message 2116 from S-CSCF 1910 can trigger a policy cache access and update of information or installation of flows in 2118.

Figure 22:
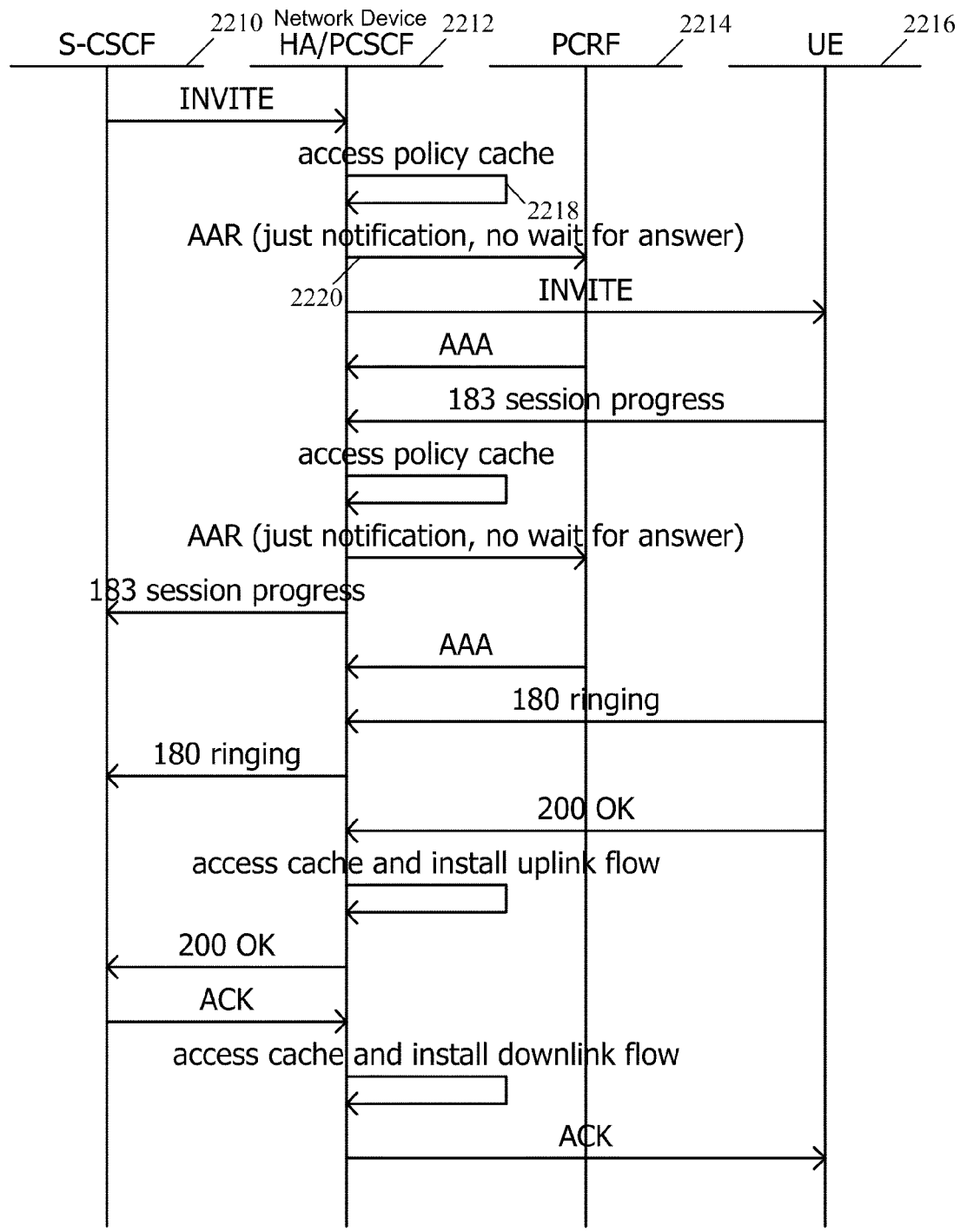
FIG. 22 is a messaging diagram of a policy charging and rules function (PCRF) synchronization in accordance with certain embodiments.

FIG. 22 illustrates a signaling diagram for PCRF synchronization in accordance with certain embodiments. FIG. 22 includes a S-CSCF 2210, a network device implementing a HA/PCSCF 2212, a PCRF 2214, and UE 2216. A policy cache implementation at a network device might cause dynamic policy coherency issues at the PCRF 2214. For example, during optimized call scenarios where the network device including a session control manager (SCM) takes independent policy decisions based on cache hits, information such as the bandwidth usage for that subscriber may not be relayed to the PCRF. Hence, PCRF call detail records (CDRs) may not include details regarding the particular session. In some embodiments the Tx interface can be modified to include a DIAMETER-based attribute value pair (AVP) which is used to provide notification to update the information in PCRF 2214. Even in embodiments including this notification message, the notification message does not increase latency due to its asynchronous nature. In 2218, the policy cache of the network device is accessed and an AA-request (AAR) message 2220 is sent from the HA/PCSCF 2212 to PCRF 2214. AAR message 2220 is just a notification to PCRF 2214 and no answer is needed for the HA/PCSCF 2212 to proceed. The AAR message 2220 can include information to update the PCRF 2214 about the status of the session. This can include updating the call detail records (CDRs).

The proxy agent and local policy cache described above is implemented in a network device in some embodiments. This network device can implement multiple and different functionalities. In some embodiments, an access gateway, a packet data serving node (PDSN), a foreign agent (FA), or home agent (HA) can be implemented on a network device. Other types of functionalities can also be implemented on a network device in other embodiments are a Gateway General packet radio service Service Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A network device can include a PDSN, a FA, a HA, a GGSN, a PDIF, an ASNGW, a UPE, an IP Gateway, an access gateway, or any other applicable access interface device. In certain embodiments, a network device is provided by Starent Networks, Corp. of Tewksbury, Mass. in a ST16 or a ST40 multimedia platform.

The features of a network device that implements policy proxy and local policy, in accordance with some embodiments, are further described below. The network device includes slots for loading application cards and line cards. A midplane can be used in the network device to provide intra-network device communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the network device implemented by establishing inter-card communications between application cards and line cards. The control bus interconnects the control and management processors within the network device. The network device management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The network device supports at least two types of application cards: a switch processor card and a packet accelerator card. The switch processor card serves as a controller of the network device and is responsible for such things as initializing the network device and loading software configurations onto other cards in the network device. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the network device provide input/output connectivity and can also provide redundancy connections as well.

The operating system software can be based on a Linux software kernel and run specific applications in the network device such as monitoring tasks and providing protocol stacks. The software allows network device resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, or PDIF).

The network device' software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device' ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Shared configuration task subsystem provides the network device with an ability to set, retrieve, and receive notification of network device configuration parameter changes and is responsible for storing configuration data for the applications running within the network device. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A network device providing integrated functionality comprising:
 a policy agent that is configured to store in a computer readable memory policy information including local policy information and network policy information configured in a hierarchy, wherein the local policy information includes device-level policies and the network policy information includes network-level policies, and wherein the local policy information and the network policy include polices based on call session control function (CSCF) information;
 a policy charging and enforcement function (PCEF) residing in the network device that is configured to manage at least one packet flow through the network device using a first policy information received from the policy agent;
 a call session control function (CSCF) residing in the network device that is configured to handle call session setup and teardown and analyze requested media parameters against a second policy information received from the policy agent;
 the policy agent in response to receiving a request to provide the first policy information to the PCEF, searching the computer readable memory to determine if the computer readable memory stores the first policy information;
 if the computer readable memory stores the first policy information, retrieving the first policy information from the computer readable memory and providing the first policy information to the PCEF; and
 if the computer readable memory does not store the first policy information, receiving the first policy information from a policy server, storing the first policy information in the computer readable memory, and providing the first policy information to the PCEF.

2. The network device of claim 1, wherein the computer readable memory is part of a CSCF local cache.

3. The network device of claim 2, wherein the computer readable memory of the policy agent is a database that is indexed on a per subscriber basis and stores registration specific information for a subscriber.

4. The network device of claim 2, wherein the computer readable memory includes an aging mechanism to refresh the cache.

5. The network device of claim 1, wherein the PCEF is implemented as a PDN gateway (PGW) and the policy server is implemented as a policy charging and rules function (PCRF).

6. The network device of claim 1, wherein the policy agent authorizes a media request received at the CSCF and provides this policy information to the CSCF and the policy agent authorizes quality of service (QoS) resources at the PCEF.

7. The network device of claim 1, wherein the policy agent tracks quality of service (QoS) for each flow for a subscriber at the policy agent and checks the policy agent when a resource reservation protocol (RSVP) message is received at the network device.

8. The method of claim 1, wherein the local policy information includes policies based on a CSCF service subscription and a network operator's CSCF service configuration.

9. The method of claim 1, wherein the network policy information includes user policy information.

10. A method of retrieving policies locally comprising:
receiving a request for a first session at a network device including a call session control function (CSCF), a policy agent, and a policy charging and enforcement function (PCEF);
retrieving policy information for a subscriber from a policy server if the policy information is unavailable locally at the network device from the policy agent;
storing the policy information at the network device in a computer readable memory accessible by the policy agent;
receiving a second request for a second session at the network device and checking if the policy information for the subscriber is available through the policy agent;
accessing the policy agent from the CSCF to obtain the policy information stored locally for the subscriber when setting up a packet flow;
accessing the policy agent from the PCEF to manage the packet flow using the policy information received from the policy agent;
storing through the policy agent the policy information including local policy information and network policy information in the computer readable memory configured in a hierarchy and wherein the local policy information and the network policy information include policies based on CSCF information; and
providing at the policy agent the local policy information providing device-level policies and the network policy information providing network-level policies.

11. The method of claim 10, further comprising accessing the policy agent locally when terminating the second flow for charging purposes rather than communicating with the policy server.

12. The method of claim 10, further comprising indexing the computer readable memory of the policy agent on a per subscriber basis and storing registration specific information for a subscriber.

13. The method of claim 10, further comprising accessing the policy agent from a PDN gateway (PGW) residing on the network device to obtain policy information.

14. The method of claim 10, further comprising refreshing the computer readable memory based on the determination of an aging mechanism.

15. The method of claim 10, further comprising authorizing at the policy agent a media request for the first flow and authorizing quality of service (QoS) resources.

16. The method of claim 10, further comprising tracking quality of service (QoS) for each flow for a subscriber at the policy agent and checking the policy agent when a resource reservation protocol (RSVP) message is received at the network device.

17. Logic encoded in one or more non-transient media for execution and when executed configured to:
receive a request for a first session at a network device including a call session control function (CSCF), a policy agent, and a policy charging and enforcement function (PCEF);
request policy information for a subscriber from a policy server if the policy information is unavailable locally at the network device from the policy agent;
store the policy information at the network device in a computer readable memory accessible by the policy agent;
receive a second request for a second session at the network device and checking if the policy information for the subscriber is available through the policy agent;
access the policy agent from the CSCF to obtain the policy information stored locally for the subscriber when setting up a packet flow;
access the policy agent from the PCEF to manage the packet flow using the policy information received from the policy agent;
store through the policy agent the policy information including local policy information and network policy information in the computer readable memory configured in a hierarchy and wherein the local policy information and the network policy information include policies based on CSCF information; and
provide at the policy agent the local policy information providing device-level policies and configured and the network policy information providing network-level policies.

18. The logic of claim 17, further comprising access the policy agent locally when terminating the second flow for charging purposes rather than communicating with the policy server.

19. The logic of claim 17, further comprising authorize a media request for the first flow and authorize quality of service (QoS) resources.

20. The logic of claim 17, further comprising track quality of service (QoS) for each flow for a subscriber at the policy agent and check the policy agent when a resource reservation protocol (RSVP) message is received at the network device.

\* \* \* \* \*